United States Patent [19]

Alley et al.

[11] 4,346,755
[45] Aug. 31, 1982

[54] TWO STAGE CONTROL CIRCUIT FOR REVERSIBLE AIR CYCLE HEAT PUMP

[75] Inventors: Robert P. Alley, Onondaga, N.Y.; Walter J. Pohl, Louisville, Ky.; John W. Relyea, Onondaga, N.Y.

[73] Assignee: General Electric Company, Louisville, Ky.

[21] Appl. No.: 151,855

[22] Filed: May 21, 1980

[51] Int. Cl.³ .......................................... F25B 29/00
[52] U.S. Cl. ...................................... 165/17; 165/27; 165/29; 62/160; 236/78 D
[58] Field of Search ............... 62/160, 325; 236/78 D, 236/1 E; 165/17, 25, 27, 29, 26

[56] References Cited

U.S. PATENT DOCUMENTS

| | | | |
|---|---|---|---|
| 3,616,846 | 11/1971 | Wills | 165/26 |
| 3,761,018 | 9/1973 | Rekai | 165/26 X |
| 3,844,475 | 10/1974 | Kesterson et al. | 236/1 E |
| 4,024,722 | 5/1977 | McCarty | 165/29 X |
| 4,083,397 | 4/1978 | Kimpel et al. | 165/26 |
| 4,228,846 | 10/1980 | Smorol | 165/29 X |
| 4,252,270 | 2/1981 | Taylor et al. | 165/27 X |
| 4,285,210 | 8/1981 | McCarty | 62/325 |

Primary Examiner—Albert W. Davis
Assistant Examiner—Margaret A. Focarino
Attorney, Agent, or Firm—Frank P. Giacalone; Radford M. Reams

[57] ABSTRACT

A two-stage circuit for controlling all operational functions of a reversible air cycle heat pump unit, including room thermostat functions and defrosting functions. All user controllable functions are controlled via a remotely locatable thermostat-like control unit mounted on an inside wall of the room separate from the heat pump unit, and connected to the heat pump unit with only five conductors. A number of desirable functions and features are provided. For example, for optimum energy usage the control provides two stages in both heating and cooling modes of operation, with almost constant temperature differential between the two stages regardless of temperature setting, and almost constant hysteresis for each stage. To facilitate compliance with Government-imposed regulations where applicable, heating and cooling limits are independently adjustable without any modification whatsoever for use in those public buildings where heating and cooling must be limited.

25 Claims, 7 Drawing Figures

TWO STAGE CONTROL CIRCUIT FOR REVERSIBLE AIR CYCLE HEAT PUMP

BACKGROUND OF THE INVENTION

The present invention relates generally to a two stage control circuit for air conditioning applications and, more particularly, to a circuit for controlling room temperature thermostat and demand defrost functions of a reversible air cycle heat pump.

While various aspects and features of the present invention are adaptable to a variety of air conditioner and heat pump units, the invention is particularly adapted for the control of an air valve heat pump wherein, to alternately provide heating and cooling modes of operation, indoor and outdoor airflow is redirected across the condensor and evaporator, rather than by reversing the function of the evaporator and condensor heat exchangers as is more conventional in heat pump practice. In particular, while the unit is operating in the cooling mode, outdoor air circulates in heat exchange relationship with the condensor, and indoor air circulates in heat exchange relationship with the evaporator. Conversely, during heating mode operation, outdoor air circulates in heat exchange relationship with the evaporator, and indoor air circulates in heat exchange relationship with the condensor. A commonly-assigned U.S. patent application Ser. No. 144,796, filed Apr. 28, 1980, by McCarty et al, and entitled "AIR VALVE HEAT PUMP" is directed to such a heat pump, to which reference may be had for further information.

While various arrangements may be employed to defrost the evaporator of such a heat pump, a presently prefered arrangement involves a passive defrosting system wherein, when defrosting is required, operation of the refrigerant compressor is interrupted, and refrigerant pressure within the system is allowed to equalize, with attendant equalization of temperature. In this way, heat from various elements of the system is allowed to reach the evaporator, melting the frost therefrom. Various valving arrangements may be employed to hasten and augment this process. Such a defrosting arrangement is the subject matter of another commonly-assigned U.S. patent application Ser. No. 144,795, filed Apr. 28, 1980, by McCarty, now U.S. Pat. No. 4,285,210 and entitled "SELF-CONTAINED HEATING AND COOLING APPARATUS", to which reference may be had for further information.

By way of example, a reversible heat pump for which the circuit of the present invention is particularly intended comprises a single room-sized unit mountable in an opening through an outdoor wall of a building, the single unit including all major components, namely the evaporator, condensor, compressor, fans, auxillary electric resistance heaters, as well as a major portion of the present control circuitry.

SUMMARY OF THE INVENTION

It is an object of the present invention to provide a highly-effective low cost control circuit for air conditioning applications generally, and more particularly, for a reversible air cycle heat pump of the type described generally above.

It is another object of the invention to provide such a control circuit which accomplishes a variety of functions, but which is relatively low in cost.

Briefly, by the present invention there is provided a circuit for controlling all operational functions of such a heat pump unit, including room thermostat functions and defrosting functions. All user controllable functions are controlled via a remotely locatable thermostat-like control unit mounted on an inside wall of the room separate from the heat pump unit, and connected to the heat pump unit with only five conductors. A number of desirable functions and features are provided. For example, for optimum energy usage the control provides two stages in both heating and cooling modes of operation, with almost constant temperature differential between the two stages regardless of temperature setting, and almost constant hysteresis for each stage. To facilitate compliance with Government-imposed regulations where applicable, heating and cooling limits are independently adjustable without any modification whatsoever for use in those public buildings where heating and cooling must be limited.

Additional features of the subject control circuit are an inhibiting of all power functions either when the user operable mode switch is between the "heat" and "cool" positions, the ON/OFF switch on the remotely locatable unit is OFF, or the remotely locatable unit is disconnected.

Further, evaporator demand defrost for both heating mode and cooling mode of operation is provided. During heating mode defrost when the evaporator is exposed to outside air, the evaporator fan is allowed to operate if the outside air temperature is above freezing, thus allowing the outside air to aid in the defrosting operation. Operation of the evaporator fan is inhibited during heating mode defrosting in the event the outside air temperature is below freezing, thereby avoiding additional cooling of the evaporator which would otherwise slow or even prevent defrosting of the evaporator.

The remotely-locatable control unit, through the only five wires mentioned above, allows control over a number of functions, including ON/OFF, and independent setting of heating and cooling limits where required. Additionally, the remote control unit has a pair of lamps which illuminate to indicate whether the heat pump unit is in the heating or the cooling mode of operation, the mode switch itself being on the main unit as a part of the air valve arrangement.

Briefly stated, and in accordance with a more particular aspect of the invention, there is provided a two stage control circuit for a reversible air cycle heat pump unit of the type having a heating mode and a cooling mode of operation and which includes a closed circuit refrigeration system having a compressor, an evaporator, and a condensor. The heat pump unit further includes a pair of two-speed motor driven fans for moving air over the evaporator and condensor respectively, and an air valve arrangement for alternatively circulating outdoor air flow over the evaporator and indoor air flow over the condensor during heating mode operation, and circulating indoor air flow over the condensor and outdoor airflow over the evaporator during cooling mode operation. The heat pump additionally includes at least one controllable supplemental electric resistance heater for warming indoor air during heating mode operation.

In particular, the control circuit of the present invention includes a mode switch, preferably ganged with the air valve arrangement of the heat pump unit, for making predetermined electrical connections depending upon whether heating mode or cooling mode operation is selected. The circuit includes a first stage controlled switching device, such as a relay, connected, when activated, to energize the compressor and the fans, and a second stage controlled switching device, for example another relay, connected, when activated, to condition the fans for relatively higher speed operation and to activate the supplemental electric heater if heating mode operation is selected.

Thus, for the first stage of either heating or cooling, the refrigerant compressor is energized and the evaporator and condenser fans are operated at low speed. When additional heating or cooling is required to maintain a desired temperature, the second stage of heating or cooling is activated. The second stage for heating mode operation involves energizing the supplemental electric resistance heater preferably positioned in the path of warm air discharged back into the room, along with switching the fans to their relatively higher speed of operation. The second stage for cooling mode operation involves switching both fans to their higher speed of operation.

The control circuit additionally includes thermostatic control circuitry for comparing sensed indoor temperature with a temperature setting and for activating the first and second stage controlled switching devices depending upon the difference between sensed indoor temperature and the temperature setting. In particular, the thermostatic control circuitry is operable when the heating mode is selected to activate the first stage switching device if sensed indoor temperature is below the temperature setting, and to additionally activate the second stage switching device if sensed indoor temperature is below the temperature setting by a predetermined additional amount, termed the first and second stage "temperature differential." The thermostatic control circuitry is operable when the cooling mode is selected to activate the first stage switching device if sensed indoor temperature exceeds the temperature setting and to additionally activate the second stage switching device if sensed indoor temperature exceeds the temperature setting by the first and second stage differential temperature.

In order to avoid unnecessary operation of the supplemental electric resistance heater during heating mode operation with attendant unnecessary operating expense, circuitry is included for sensing outdoor air temperature and inhibiting activation of the supplemental electric heater during heating mode operation if outdoor air temperature exceeds a predetermined temperature. This predetermined temperature is selected according to the mechanical and thermodynamic characteristics of the particular heat pump unit. A typical predetermined temperature is 36° F. One particular way in which activation of the supplemental electric heater may be inhibited is simply by inhibiting activation of the second stage controlled switching device during heating mode operation if outdoor temperature exceeds the predetermined temperature.

The present control circuit preferably includes cooling mode demand defrost circuitry for recognizing excessive frost accumulation on the evaporator and for interrupting operation of the compressor in response to allow defrosting. The cooling mode demand defrost circuitry includes a sensor for sensing the temperature of a portion of the evaporator, and circuitry responsive to the evaporator sensor for inhibiting activation of the first stage controlled switching device when sensed evaporator temperature falls below a predetermined temperature, for example 32° F., indicative of excessive evaporator frost. The circuitry again permits activation of the first stage controlled switching device when sensed evaporator temperature again rises above the predetermined temperature.

During this cooling mode defrosting operation, operation of the second stage is not inhibited, and the evaporator and condensor fans are permitted to operate at their relatively higher speed in the event the room temperature thermostat control circuitry is calling for the second stage of cooling. The resultant circulation of indoor air over the evaporator aids in the defrosting operation, and hastens return to normal operation.

Demand defrost circuitry for the heating mode is also provided. Since, during heating mode operation, the evaporator is exposed to cold outside air which may be well below 32° F., the relatively simple demand defrost scheme described above for cooling mode operation cannot be employed. Instead, the present control circuit implements a demand defrost system wherein the heat exchange efficiency of the evaporator is monitored by determining differential temperature between the cold outside air entering the evaporator and the temperature of the evaporator itself. During operation, as a layer of frost develops on the evaporator, the temperature of the evaporator decreases, even though the temperature of the outdoor air may remain constant.

Specifically, sensors are provided for sensing the temperature of outdoor air entering the evaporator and for sensing the temperature of a portion of the evaporator. The sensor for sensing the temperature of a portion of the evaporator preferably is the same one employed for cooling mode demand defrost initiation and termination as described above. Circuitry is responsive to these two sensors for generating a signal to initiate defrosting when sensed evaporator temperature falls a predetermined amount below sensed outdoor air temperature, and additional circuitry is provided for inhibiting activation of the first stage controlled switching device in response to the signal to initiate defrosting.

This inhibiting of the first stage prevents operation of the compressor, allowing equalization of refrigerant system pressure and temperature, thus providing heat for defrosting the evaporator. In the event, outdoor air temperature is above 32° F., the evaporator fan is allowed to operate provided the room thermostat control is calling for the second stage of heating, and the above-freezing temperature outside air thus is permitted to aid in the defrosting operation. The same outdoor air temperature sensor employed for initiating heating mode demand defrost operation preferably is also used for this purpose. If, however, outside air temperature is below 32° F., then operation of the evaporator fan is inhibited, preventing outdoor air from further cooling the evaporator.

During heating mode defrost operation it is possible that the supplemental electric resistance heater which normally is energized during heating mode second stage operation may not be sufficient to warm the room. A second supplemental electric heater is provided and is energized during heating mode operation in the event activation of the first stage switching device is inhibited, thus compensating for the absence of heat pump operation during defrosting.

While a variety of approaches may be taken for terminating heating mode demand defrost operation, the one which is presently preferred involves a sensor for sensing the presence of cold defrost water draining from the evaporator, and which is connected for terminating the heating mode defrosting operation when the flow of evaporator drain water ceases. In particular, this sensor is a "stopper" temperature sensor positioned in the path of evaporator drain water such that the temperature sensor is maintained at a temperature of approximately 32° F. so long as water is flowing. When the evaporator is completely defrosted and the flow of cold defrost water draining therefrom accordingly ceases, this "stopper" temperature sensor increases in temperature, and this increase is recognized by the circuitry to terminate the defrosting operation.

A number of important features and aspects of the invention involve the thermostatic control circuitry including the remotely locatable user control unit. In particular, the user control unit comprises a portion of the thermostatic control circuitry and is locatable remotely from a main portion of the control circuit, which main portion is physically located with the main heat pump unit. It will be appreciated, however, while more accurate control of room temperature results when the thermostat unit is remotely located from the heat pump unit, in certain applications it may be desired to locate the remotely locatable control unit on the unit main heat pump itself, and the operational characteristics remain unchanged.

Power is supplied to the remotely locatable user control unit from the control circuit main portion via a pair of supply conductors, with one of the pair of supply conductors further subdivided into a heating mode select conductor and a cooling mode select conductor alternately selected for continuity by the mode switch ganged with the air valves of the heat pump unit. The remotely locatable user unit recognizes which of these heating and cooling mode select conductors is selected in order to vary the configuration of the temperature control circuitry as appropriate for heating or cooling mode. Additionally, heating and cooling mode indicator lamps located in the user control unit are operated depending upon which of the select conductors is selected.

More particularly, the remotely locatable user control unit has a temperature setting potentiometer connected in adjustable voltage divider configuration across the pair of supply conductors to provide a voltage representative of the desired degree of heating or cooling. In the particular control circuit described herein, this user control bears the legend "More" and the setting thereof is increased in the same direction irrespective of whether "More" heating or "More" cooling effect is desired. While it will be understood and appreciated that particular voltage magnitudes, polarities, and directions of change are merely matters of design choice, in the exemplary embodiment disclosed herein, this voltage representative of the desired degree of heating or cooling increases in a positive sense when either "More" heating or "More" cooling is desired.

The temperature setting potentiometer is connected in combination with independent heat and cool trimmers respectively selected in response to the heating and cooling mode select conductors and arranged to controllably limit user selection of the voltage representative of the desired degree of heating or cooling, thereby to facilitate compliance with Government-imposed building temperature regulations where applicable.

The remotely locatable user control unit additionally has an indoor temperature sensor connected in a circuit to provide a voltage representative of the actual degree of heating or cooling. The indoor temperature sensor circuit is responsive to the heating and cooling mode select conductors to selectively cause the voltage representative of the actual degree of heating or cooling to vary either directly or inversely with sensed temperature to match the characteristic and configuration of the temperature setting potentiometer. In the particular embodiment described in detail herein, for heating mode operation, the voltage representative of the actual degree of heatin or cooling varies directly with sensed room temperature, and, during cooling mode operation, varies inversely with sensed room temperature.

Comparator circuitry is located in the main portion of the control circuitry and is responsive to both the voltage representative of the desired degree of heating or cooling and to the voltage representative of the actual degree of heating or cooling to activate the first and second stage controlled switching devices depending upon the amount by which the voltage representative of the actual degree of heating or cooling falls short of the voltage representative of the desired degree of heating or cooling. It is a particular feature of the invention that, since the reversal in direction of voltage change is accomplished within the remotely locatable control unit, the comparator circuitry located in the main portion of the control circuit need not be reconfigured when switching between heating mode and cooling mode operation. In particular, the first and second stage switching devices are activated in the same manner depending upon the amount by which the voltage representative of the actual degree of heating or cooling falls short of the voltage representative of desired degree of heating or cooling, without respect to whether the unit is in the heating or cooling mode of operation.

More particularly, this comparator circuitry comprises first and second stage comparators each having a reference input connected to receive the voltage representative of the desired degree of heating or cooling, and a comparison input connected to receive the voltage representative of the actual degree of heating or cooling. The first and second stage comparators have outputs respectively connected to the first and second stage controlled switching devices. The comparator circuitry additionally includes a biasing circuit arrangement for shifting the switching threshold of the first and second stage comparators with respect to each other to provide a temperature difference (first and second stage temperature differential) between the switching points of the first and second stage controlled switching devices.

In an even more particular arrangement, each of the first and second stage comparators has a pair of series input resistors connected to the voltage representative of the desired degree of heating or cooling and the voltage representative of the actual degree of heating or cooling, and the biasing circuit arrangement includes relatively high resistances connected to cause a biasing current to flow between positive and negative supply conductors through an input resistor of each of the first and second stage comparators. This arrangement results in a relatively constant current flowing through the input resistors, causing the same differential voltage between the two stages to be present regardless of the temperature setting.

User ON/OFF control functions are provided by a user ON/OFF switch included in the remotely locatable user control unit and connected for interrupting the supply conductors when switched to the OFF position. The main control circuit additionally includes a current detector for detecting an absence of current through the supply conductors to the remotely locatable user control unit when the user ON/OFF switch is in the OFF position, and for disabling operation of the first and second controlled switching devices in response. This particular current detecting arrangement also serves the desired function of inhibiting any operation if circuit continuity is interrupted for any reason, such as the remote unit being disconnected or a failed switch contact. Additionally, if the mode switch located in the main unit and ganged with the air valves is positioned intermediate between the heating mode and cooling mode positions, the same current detecting circuitry also desirably inhibits operation of the unit.

BRIEF DESCRIPTION OF THE DRAWINGS

While the novel features of the invention are set forth with particularity in the appended claims, the invention, both as to organization and content, will be better understood and appreciated from the following detailed description, taken in conjunction with the drawings, in which:

FIG. 6 is a further portion of the control circuit of the present invention, specifically the two stage room temperature thermostat comparator circuitry.

DESCRIPTION OF THE PREFERRED EMBODIMENT

Figure 1:
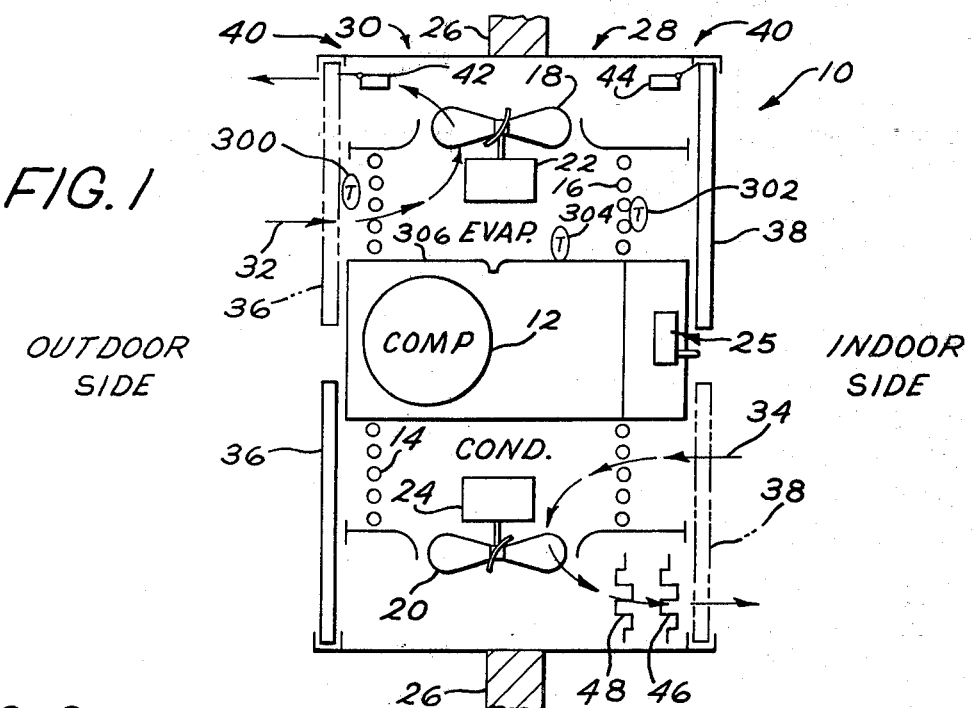
FIG. 1 is highly schematic representation of the mechanical arrangement of a reversible air cycle heat pump unit, shown during heating mode of operation, with which the circuit of the present invention is particularly adapted to be employed.

Referring first to FIG. 1, a reversible air cycle heat pump unit generally designated 10 includes a refrigerant compressor 12, a refrigerant condenser 14 for cooling and condensing hot compressed gaseous refrigerant received from the compressor 12 to warm liquid refrigerant, thereby producing heating, and an evaporator 16 within which liquid refrigerant vaporizes to produce cooling. It will be appreciated that the compressor 12, condensor 14 and evaporator 16 are all conventional elements of a closed circuit refrigeration system, the remaining details of which, including interconnections and an expansion valve, are not necessary to an understanding of the present invention and are not shown. Also shown are two two-speed motor driven fans 18 and 20 driven by respective two-speed electric motors 22 and 24 for respectively drawing air over the evaporator 16 and the condensor 14.

A main portion of the circuit of the present invention is contained within a box or suitable containment generally designated 25.

The heat pump unit 10 is shown mounted through an exterior wall 26 of a room for which the heat pump unit 10 is provided to selectively heat and cool. In the particular orientation illustrated, the right hand side 28 of the heat pump unit 10 faces the indoors, and the left hand side 30 of the heat pump unit 10 faces the outdoors.

In order to alternatively select between heating and cooling mode operation, an air valve arrangement alternatively circulates outdoor air flow 32 over the evaporator 16 and indoor air flow 34 over the condenser 14 during heating mode operation, and circulates indoor air flow over the condenser 14 and outdoor air flow over the evaporator 16 during cooling mode operation. While it will be appreciated that a variety of air valve arrangements might be employed, including arrangements involving extensive ducting, the presently preferred form of the invention involves a pair of sliding doors or panels 36 and 38 mechanically interconnected such as by a pulley and cable arrangement (not shown) to redirect the air flow as required. In FIG. 1, the solid line representation of the panels 36 and 38 shows their positioning during heating mode operation, during which the panels 36 and 38 permit circulation at the upper left of FIG. 1 of outdoor air flow 32 over the evaporator 16, and circulation at the lower right of FIG. 1 of indoor air flow over the condenser 14. For cooling mode operation, the movable panels or doors 36 and 38 are repositioned as shown in phantom lines so as to permit indoor air flow at the upper right of FIG. 1 to circulate over the evaporator 16, and outdoor air flow at the lower left of FIG. 1 to circulate over the condensor 14.

This particular reversible air valve heat pump arrangement comprises at least a portion of the subject matter of the above-mentioned commonly-assigned McCarty et al patent application Ser. No. 144,796, entitled "AIR VALVE HEAT PUMP", the entire disclosure of which is hereby expressly incorporated herein by reference. The defrosting aspects of the reversible air cycle heat pump unit 10 are described in greater detail in the above-mentioned commonly-assigned U.S. patent application Ser. No. 144,795 of McCarty, entitled "SELF-CONTAINED HEATING AND COOLING APPARATUS", the entire disclosure of which is also hereby expressly incorporated by reference.

In order to provide signals to the control circuitry, hereafter described in detail, concerning whether the movable panels 36 and 38 are in position for heating mode or cooling mode operation, a mode switch, generally designated 40, makes predetermined electrical connections depending upon whether heating mode or cooling mode operation is selected. While it will be appreciated that a variety of electrical and mechanical switching arrangements may be provided, FIG. 1 in highly schematic form illustrates a pair of switches 42 and 44, for example of the microswitch type, mechanically arranged and positioned so as to be actuated when the movable panels 36 and 38 are positioned fully home for the respective heating mode and cooling mode positions. For heating mode operation as depicted in FIG. 1, the switch 44 is actuated by the indoor panel 38, and the switch 42 is not actuated. For cooling mode operation, the converse is true. The advantage of this particular arrangement is that the circuitry may be arranged to completely inhibit all operation of the controlled components whenever the panels 36 and 38 are in an intermediate position and neither switch 42 or 44 is actuated.

Also shown in FIG. 1 is at least one controllable supplemental electric resistance heater 46 for use during the second stage of heating mode operation when heat pump operation alone is insufficient to supply the heating needs of the room. Preferably, an additional electrical resistance heater 48 is provided for use during heating mode defrosting operations when the compressor 12 is not operating. The electrical resistance heaters 46 and 48 are positioned for warming indoor air, preferably on the discharge side of the recirculating indoor air stream 34.

Figure 2:
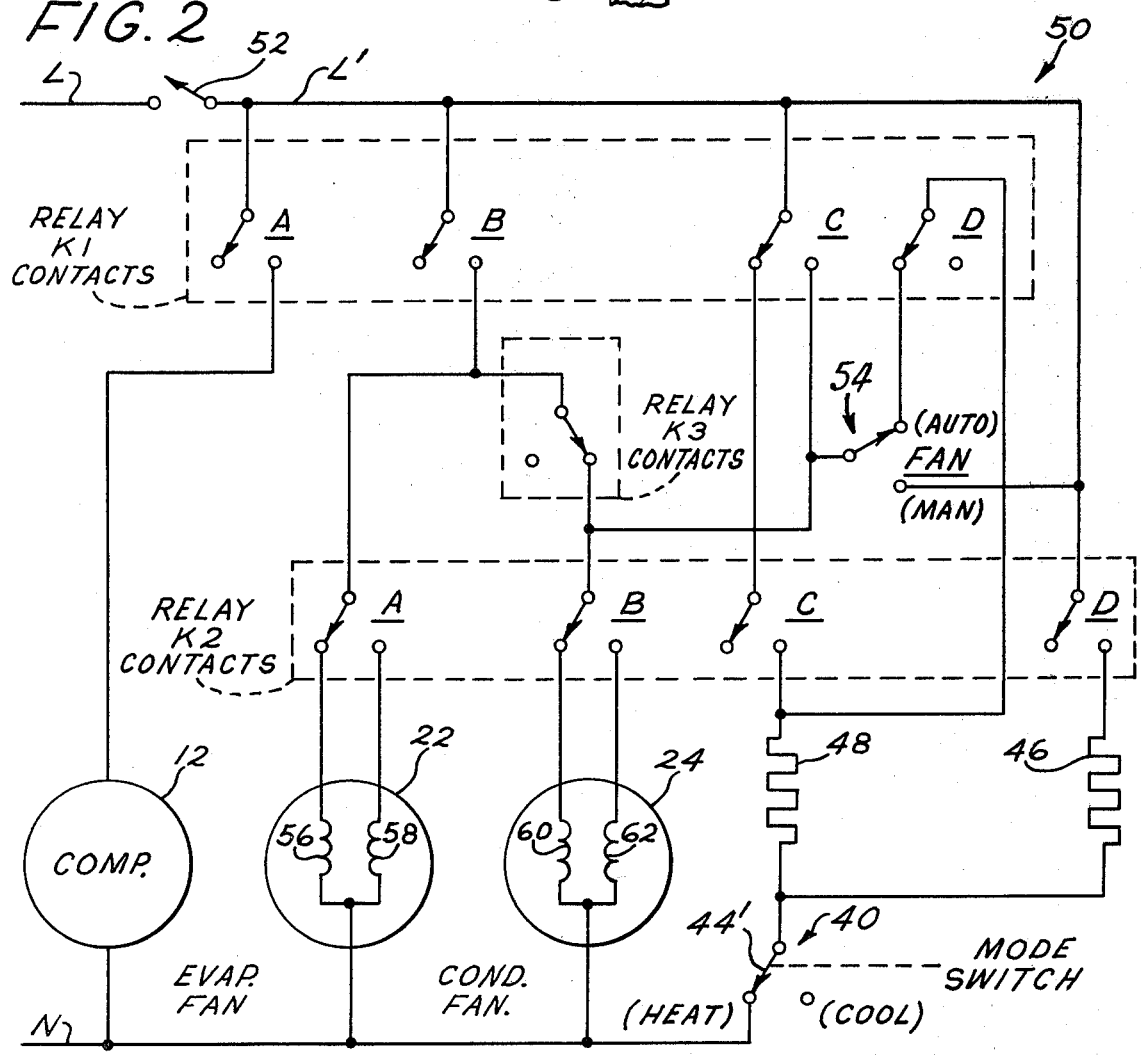
FIG. 2 is an electrical schematic diagram showing the manner in which various control relays of the present control circuit are connected to energize various components in the heat pump unit of FIG. 1 from a 120 volt, 60 Hz, household AC power source.

Referring now to FIG. 2, there is shown power control switching circuitry, generally designated 50, for appropriately energizing the various electromechanical components shown in FIG. 1 from a pair of 120 volt AC supply conductors L and N. Specifically, in FIG. 2 may be seen the compressor 12, the evaporator fan motor 22, the condensor fan motor 24, and the two supplemental electric resistance heaters 46 and 48. An additional component shown in both FIGS. 1 and 2 is the mode switch 40. Specifically, in FIG. 2 may be seen a contact 44' of the FIG. 1 switch 44, which contact is closed during heating mode operation as illustrated for the purpose of enabling activation of the supplemental electrical resistance heaters 46 and 48 during heating mode operation.

Two additional switches shown in FIG. 2 are a main AC power switch 52 which, when closed, energizes an L' line from the L conductor. Additionally, and SPDT fan switch 54 is provided to allow the user to select between continuous operation of the fans 18 and 20 and automatic control of fan operation.

The subject control circuit provides two stage operation for both heating and cooling. Correspondingly, there are provided first and second stage controlled switching devices which, in the illustrated embodiment, comprise relays having contacts K1 and K2 (the coils which actuate the relay contact K1 and K2 are described hereinbelow with particular reference to FIG. 6.) It will be appreciated, however, that other forms of controlled switching devices may equally well be employed, for example semiconductor switching elements such as thyristors.

Each of the relay contacts K1 and K2 comprises a 4PDT contact having individual sections denoted A, B, C and D. The relays are shown in their de-energized position, with their normally-closed contacts closed and their normally-open contacts open.

More particularly, the first stage controlled switching device is connected, when activated, to energize the compressor 12 through relay contacts K1-A and the fan motors 22 and 24 through the relay contacts K1-B and K1-C. The fan motors 22 and 24 preferably are each capable of rotation at both a relatively lower speed and a relatively higher speed, depending upon which windings are energized. Accordingly, evaporator fan motor 22 has a winding 56 representative of those motor windings energized for the relatively lower speed of rotation, and a winding 58 representative of the motor windings energized for the relatively higher speed of rotation.

Similarly, the condenser fan motor 24 has a relatively lower speed representative winding 60 and a relatively higher speed representative winding 62.

The second stage controlled switching device is connected, when activated, to condition the fans 18 and 20 for relatively higher speed operation by energizing the representative windings 58 and 62 through relay contacts K2-A and K2-B. Additionally, the second stage relay energizes at least the supplemental electric resistance heater 46 through relay contact K2-D when activated during heating mode operation.

In order to inhibit operation of the evaporator fan motor 22 if outdoor air temperature is below approximately 32° F. during heating mode defrost operation, a relay having contacts K3 is provided. (During heating mode defrost operation, the relay K1 is not energized, and power for the evaporator fan motor 22 must come through relay contacts K3.) The coil of the relay K3 is described hereinafter with particular reference to FIG. 7.

The control circuit of the present invention includes thermostatic control circuitry for comparing sensed indoor temperature with a temperature setting and for activating the first and second stage controlled switching devices comprising relay contacts K1 and K2 depending upon the difference between sensed indoor temperature and the temperature setting.

While the detailed thermostatic control circuitry is described hereinafter with particular reference to FIGS. 5 and 6, it is believed that this circuitry and its operation will better understood in light of the following description of the thermostatic control characteristics with particular reference to FIGS. 3 and 4.

Figure 3:
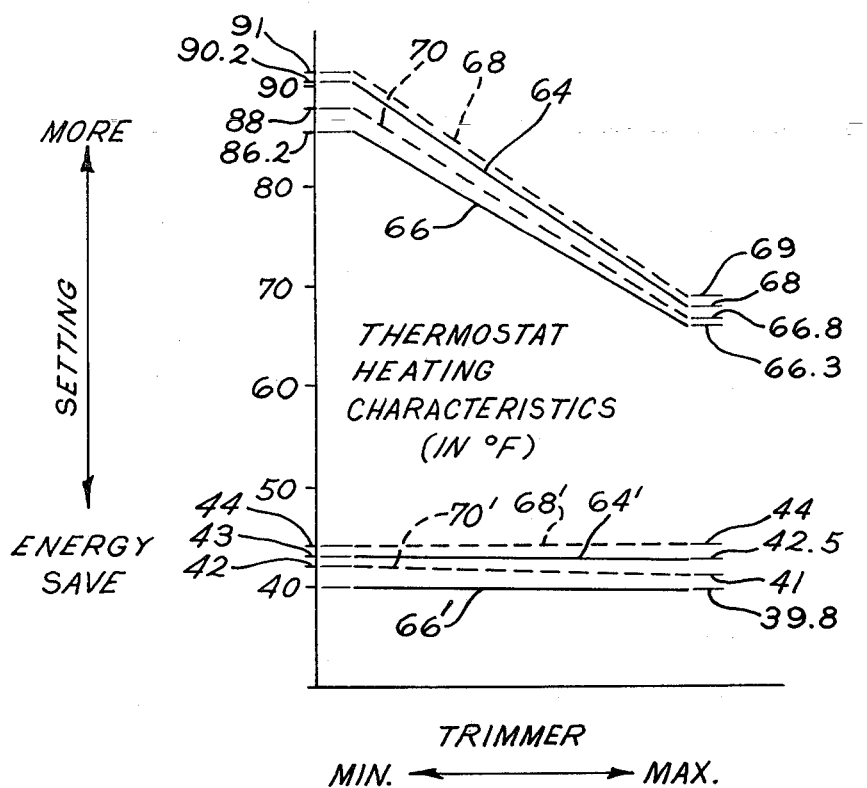
FIG. 3 is a graph depicting control and limiting characteristics of one form of two-stage room temperature thermostat during heating mode operation.

Referring first to FIG. 3, heating characteristic curves of the two-stage thermostat are shown as a function of both the user operable "Setting" control, and as a function of a hidden trimmer which serves to limit the maximum temperature which may be selected by a user having access only to the "Setting" control. In particular, with the trimmer set for minimum limiting, a full control range for the heating function is available. However, with the trimmer set for maximum limiting, the room temperature setting is limited as required by Government regulations for certain buildings. This feature of the subject control circuit permits a single type of unit to be manufactured which can then readily be adjusted in the field to suit the particular application desired, i.e., either in a private home or a public building.

In FIG. 3, the ON switching thresholds of the first and second stages of heating are respectively denoted by solid lines 64 and 66, and the first and second stage OFF switching thresholds are denoted by dash lines 68 and 70 respectively. The characteristic lines at the high end of the temperature setting (towards the "More" heat end) are denoted by plain reference numerals, while those at the lower end of the temperature setting (energy save) are denoted by primed reference numerals.

Assuming first that the trimmer is set for minimum temperature limiting, and the user operable "Setting" control is set at its maximum, i.e., calling for "More" heat, then the set of four temperatures at the upper left of the graph apply.

In one example of the operation, if the room temperature is above 91° F., then no heat is required, and the heat pump unit does not operate. As room temperature falls, eventually the line 64 is reached (90.2° F.) at which the first stage comes on and the relay K1 is activated, energizing the compressor 12 (FIGS. 1 and 2) and the fan motors 22 and 24. Since at this point relay K2 is not yet activated, the fan motors 22 and 24 run at their relatively lower speed. If room temperature nevertheless continues to fall, eventually the line 66 (86.2° F.) is reached, at which the second stage of heating is activated. In particular, the relay K2 is activated, energizing the high speed windings 58 and 62 of the evaporator and condensor fan motors 22 and 24. Additionally, the supplemental electric resistance heater 46 is activated.

At this point, assuming adequate capacity, the room temperature is increasing. When the temperature denoted by line 70 is reached (88° F.), the second stage deactivates, and the circuit reverts to frist stage operation. Finally, when the temperature denoted by the line 68 is reached (91° F.), the first stage is deactivated, and the system reverts to standby mode.

The temperature spread between the point at which a given stage (first or second) switches on and switches off is known as hysteresis, and is desirable for control stability and necessary to prevent "short cycling" of the compressor 12, as is known in the art. The hysteresis between the first stage ON and OFF lines 64 and 68 is approximately 1.5° F. The hysteresis between the second stage ON and OFF lines 66 and 70 is approximately 1.5° F.

Another system characteristic shown in the graph of FIG. 3 is the temperature differential between the first and second stages. During turn on of these stages, the differential temperature is represented by the distance between the first stage ON line 64 and the second stage ON line 66, for example, 3° to 4° F. After the desired temperature is reached, the turn off temperature differential between the two stages is represented by the distance between the second stage OFF line 70 and the first stage OFF line 68, also approximately 3° to 4° F.

From FIG. 3, it may be seen that as the user "Setting" control is varied between the limits represented by the legend "More" and the legend "Energy Save", the entire characteristic curve is shifted generally vertically, with the extreme lower limit being the point on the characteristic curves where the first stage OFF line 68' is at 44° F. It is feature of the present thermostatic control that the hysterisis of each stage and the temperature differential between the two stages both remain relatively constant throughout the control range.

The remaining variable shown in FIG. 3 is the setting of the "Trimmer" control which is a part of the remote user operable control unit, but inaccessible without removing the cover. If the "Trimmer" control is turned all the way to the maximum setting, meaning there is maximum temperature limiting, the warmest temperature which may be selected by a user, even with the "Setting" control turned all the way to the "More" limit, is approximately 69° F., above which the entire system is in standby. The timmer, however, does not significantly affect the lower end of the user control setting, as may be seen.

Figure 4:
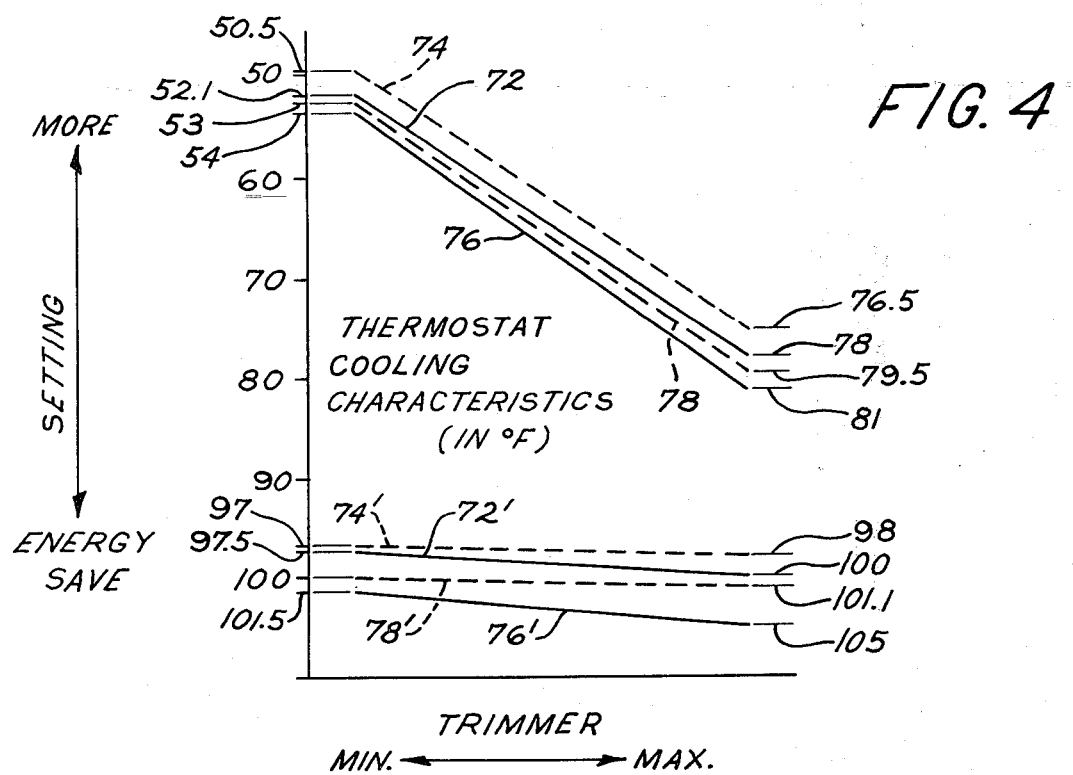
FIG. 4 is a similar graph depicting control and limiting characteristics of the thermostat during cooling mode operation.

FIG. 4 is a similar graph depicting the thermostat cooling characteristics, differing primarily in that the order of temperatures along the vertical axis is reversed. Comparing FIGS. 3 and 4, it will be seen that a user setting of "More" reflects a request for either more heating or more cooling, as the case may be depending on whether heating mode or cooling mode operation is selected.

Thus the user setting control action is quite different than is conventionally employed. Specifically, conventionally the user is provided with an adjustment lever calibrated in terms °F., the temperature increasing as the lever is moved to the right and decreasing as the lever is moved to the left. During heating mode operation, the user moves the lever to the right where more heat is required; during cooling mode operation, the user moves the lever to the left when more cooling is desired. In contrast, in the subject system, the lever is moved in the same direction whether it is "more" heating or "more" cooling which is desired. It will be appreciated that in the particular thermostatic control system described herein, it is not readily convenient (although certainly not impossible) to calibrate the user setting control in terms of temperature per se. Rather, it is contemplated that the user simply adjust the setting control to what is comfortable.

Referring now more particularly to FIG. 4, first stage ON and OFF lines are designated 72 and 74 respectively, and second stage ON and OFF lines are designated 76 and 78, respectively. Consistent with FIG. 3, the curves for the extreme "Energy Save" end of the "Setting" control range are designated by primed reference numerals.

Considering, for purposes of example, operation of the thermostat control when the user "Setting" control is at the extreme "More" end, and the "Trimmer" is set for maximum limiting, the set of four temperatures at the upper right corner of the characteristic curves apply. If sensed room temperature below 76.5° F., then the system is idle. If room temperature warms to 78° F., reaching the line 72 at which the first stage is energized, the relay contacts K1 are activated, energizing the compressor 12 and the fan motors 22 and 24 on low speed. If room temperature continues to rise and reaches the line 76 (81° F.) the second stage is activated and the K2 relay contacts actuate. The evaporator and condenser fan motors 22 and 24 are then switched to higher speed operation. (During cooling mode operation, neither of the supplemental electric resistance heaters 46 and 48 operate because the FIG. 2 switch contacts 44' are in the cool position and the N return for the heaters 46 and 48 is interrupted.) As indoor air circulates over the evaporator 16 to be cool and returned to the room, room temperature goes down. When the line 78 is crossed (79.5° F.), the second stage goes off, returning the evaporator and condenser fan motors 22 and 24 to low speed operation. Finally, as the line 74 is reached (76.5° F.), the first stage turns off, and the system again is in a idle condition.

Figure 5:
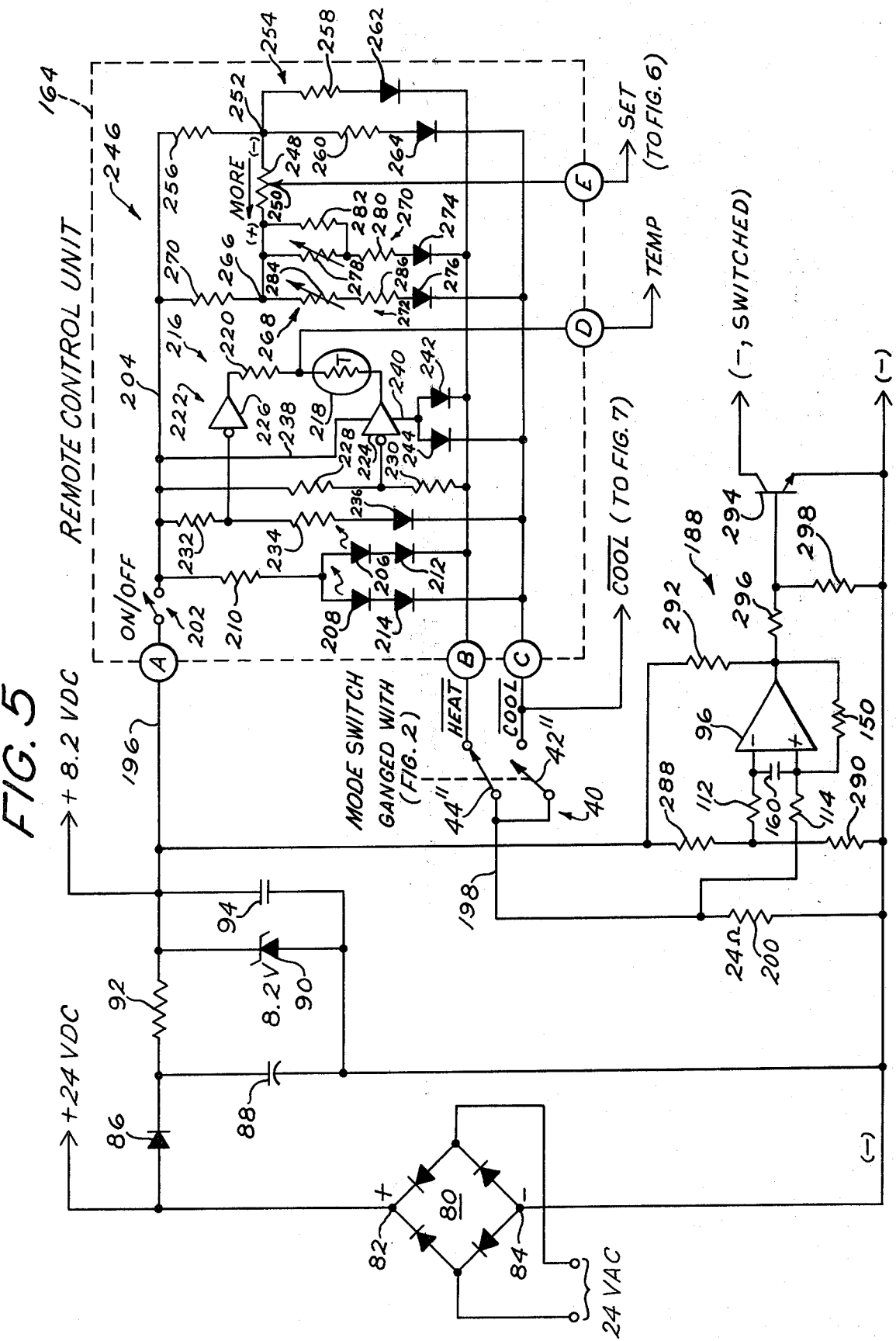
FIG. 5 is a detailed electrical schematic diagram of a portion of the control circuit of the present invention, specifically, a low voltage DC power supply, a remotely locatable user control unit, and current detecting circuitry.
Figure 6:
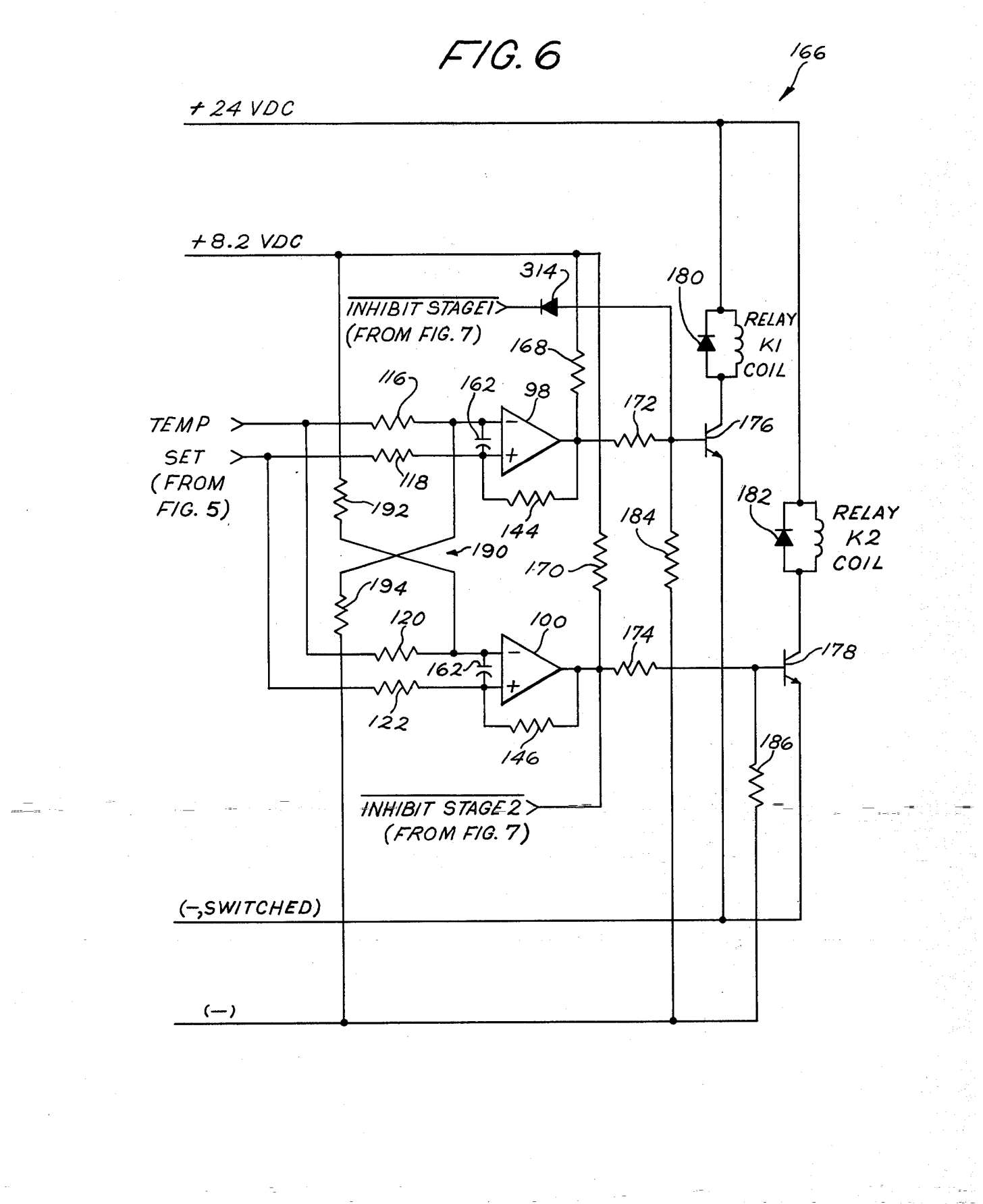
Figure 7:
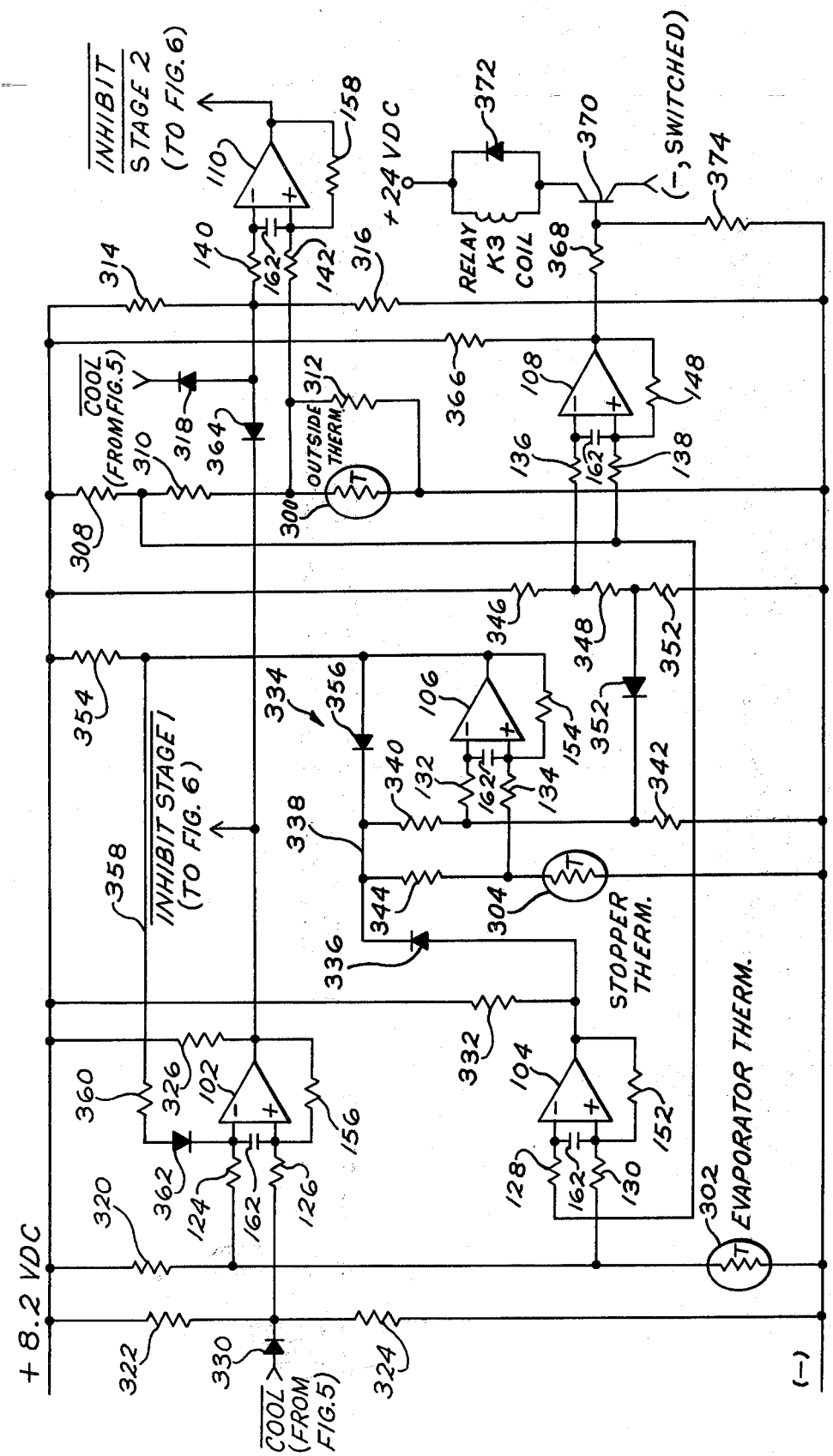
FIG. 7 is a detailed electrical schematic diagram of the remainder of the present control circuit, particularly the heating and cooling mode demand defrost portions thereof.

The remaining FIGS. 5, 6 and 7 together are an electrical schematic diagram of a preferred form of control circuit in accordance with the invention, including relay coils corresponding with the relay contacts illustrated in FIG. 2.

Referring initially to FIG. 5, a low voltage power supply for the circuitry includes a transformer (not shown) energized from the L' and conductors of FIG. 2 and supplying twenty-four volts AC to a bridge rectifier 80 having positive and negative DC output terminals 82 and 84. The negative output terminal 84 is connected to a (−) line which serves as a common reference line for the circuitry. The positive output terminal 82 directly supplies a +24 VDC line for energizing the relay coils with pulsating DC.

A low voltage regulated power supply comprises a series isolation diode 86, a filter capacitor 88, and an 8.2 volt Zener diode 90 with a series voltage dropping resistor 92 and a parallel high frequency bypass capacitor 94. This power supply circuit supplies +8.2 VDC to the remainder of the circuitry along the line so designated.

In overview, the active portion of circuit employs a plurality of integrated circuit comparators 96, 98, 100, 102, 104, 106, 108, and 110. While a variety of integrated circuit comparators may be suitable, preferred comparators are those included in Motorola Type No. MC3302 single-supply comparator integrated circuit packages, National Semiconductor Type No. LM3302, or equivalent. These comparators have open collector outputs such that the output of a plurality of individual comparators may be connected in parallel, sharing a single pull-up resistor. For clarity of illustration, the supply voltage connections to these comparators are not shown; it will be understood that they are supplied from the +8.2 VDC and the (−) lines.

Although operated as generally as comparators and not as operational amplifiers, to enable positive feedback to be applied each of the comparators includes a pair of series input resistors connected respectively to the inverting (−) and non-inverting (+) inputs. An exemplary value for each of the input resistors throughout the entire circuit is 150 K ohms. Specifically, the FIG. 5 comparator 96 has input resistors 112 and 114, the comparator 98 has input resistors 116 and 118, the FIG. 6 comparator 100 has input resistors 120 and 122, the comparator 102 has input resistors 124 and 126, the comparator 104 has input resistors 128 and 130, the comparator 106 has input resistors 132 and 134, the comparator 108 has input resistors 136 and 138, and the comparator 110 has input resistors 140 and 142.

For stability and noise immunity, each of the comparators of the system has a relatively high resistance positive feedback resistor connected between the comparator output and the non-inverting (+) input. Additionally, the hysterisis-introducing positive feedback applied to the FIG. 6 comparators 98 and 100 provides the temperature hysterisis for each stage of the first and second stage thermostat switching.

Different values of positive feedback resistors are employed for the various comparators in the system. The largest degree of positive feedback is applied to the above-mentioned thermostatic control comparators 98, in the form of 7.5 megohm resistors 144 and 146. A positive feedback resistor 148 connected to the FIG. 7 comparator 108 is also 7.5 megohms. Positive feedback resistors 150, 152 and 154 for the FIG. 5 comparator 96 and the FIG. 7 comparators 104 and 106, respectively, are each 22 megohms. Lastly the FIG. 7 comparators 102 and 110 have 2.2 megohm positive feedback resistors 156 and 158.

For maximum noise immunity, each of the comparators has a capacitor connected directly across its inputs. The FIG. 5 comparator 96 has an exemplary 0.1 MFD capacitor 160, while the remaining comparators have 1.0 MFD capacitors collectively designated 162.

Considering in detail the two-stage thermostatic control circuitry, the thermostatic control circuitry comprises a user control unit 164 (FIG. 5) locatable remotely from the main portion of the control circuit, and comparator circuitry generally designated 166 (FIG. 6) located in the main portion of the control circuit in the FIG. 1 box 25.

The FIG. 6 comparator circuitry 166 is responsive to a reference voltage representative of the desired degree of heating or cooling conveyed along a SET line from the FIG. 5 remote control unit 164, and to a voltage representative of the actual degree of heating or cooling conveyed along a TEMP line from the FIG. 5 remote control unit 164. In particular, the SET line is applied through input resistors 118 and 122 to reference inputs of the two comparators 98 and 100, in this particular circuit embodiment the reference inputs being the comparator non-inverting (+) inputs. Correspondingly, the TEMP line is applied through input resistors 116 and 120 to comparison inputs of the comparators 98 and 100 which, in this particular embodiment, are the comparator inverting (−) inputs.

The outputs of the first and second stage comparators 98 and 100 have respective pull-up resistors 168 and 170 and are connected through respective current limiting resistors 172 and 174 to the bases of respective NPN first and second stage relay driver transistors 176 and 178.

The first stage switching transistor 176 drives the coil of relay K1, which has a freewheeling diode 180 connected in parallel, and the second stage switching transistor 178 drives the coil of relay K2, which has a freewheeling diode 182 connected in parallel therewith. The transistor 176 and 178 bases additionally have biasing resistors 184 and 186 connected to the (−) common circuit reference line.

In order to disable operation of the relay coils K1 and K2 when the control system is turned OFF, but AC power is still applied, the emitters of the first and second stage switching transistors 176 and 178 are returned to a switched negative conductor, denoted "-, SWITCHED", controlled by current detector circuitry 188 described hereinafter with particular reference to FIG. 5.

One feature of the invention which may be seen from FIG. 6 is the manner in which nearly constant temperature differential is maintained between the two stages for both heating mode and cooling mode operation over a wide range of possible temperature settings. With the comparator circuitry 166 as thus far described, the differential inputs (connected to the TEMP and SET lines) of each of the first and second stage comparators 98 and 100 vary in common mode fashion over a wide range between +8.2 volts DC and the negative (−) line. In order to establish a relatively constant switching voltage differential between the comparators 98 and 100 and therefore a relatively constant temperature differential between the two stages, a biasing circuit arrangement, generally designated 190, is provided for shifting the switching thresholds of the first and second stage comparators 98 and 100 with respect to each other. More particularly, the biasing circuit arrangement 190 includes a relatively high resistance, for example resistors 192 and 194, connected to cause a biasing current to flow between the positive and negative supply conductors through an input resistor each of the first and second stage comparators 98 and 100. Specifically, the resistor 192 is connected between the +8.2 VDC conductor and the junction of the second stage comparator 100 inverting (−) input with the input resistor 120, and the resistor 194 is connected between the negative (−) supply conductor and the junction of the first stage comparator 98 inverting (−) input with the input resistor 116. In order to approximate a constant current source and to provide minimal disturbance, other than the differential, to the accuracy of the thermostatic temperature control, the resistors 192 and 194 have relatively high resistance, for example, 10 megohms, which may be contrasted with the 150 K ohm resistance of the input resistors 116, 118, 120 and 122.

The current flow path as a result of the biasing circuit arrangement 190 is from the +8.2 VDC line, through the resistor 192, through the input resistor 120, through the input resistor 116, and then through the resistor 194 to the negative (−) supply conductor. Current flow through the two comparison input resistors 116 and 120 is in opposite directions, thus providing the required differential. While a particular form of biasing circuit arrangement is illustrated and described herein, it will be appreciated that various modifications of the precise technique may be employed, for example, selecting different combinations of the input resistors 116, 118, 120 and 122 for current biasing, as well as applying current biasing to only one of these resistors.

With reference again to FIG. 5, the circuitry of the remotely locatable unit 164 which provides the TEMP and SET voltages to the FIG. 6 comparator circuitry 166 will now be described in greater detail.

In FIG. 5 it will be seen that there are only five electrical connections between the remote control unit 164 and the remainder of the circuitry. These five connections are labeled A, B, C, D and E, and will be understood to be any suitable form of terminal arrangement and comprise a cable of sufficient length to extend between the box 25 in the main heat pump unit 10 and the remote control unit 164.

Power is supplied to the remote control unit 164 from the main portion of the control circuit via a pair of supply conductors 196 and 198. The supply conductor 196 is a positive supply conductor, and is connected directly to the +8.2 VDC supply line. The supply conductor 198 is a negative supply conductor and is connected through a current-sensing resistor 200 to the negative (−) supply conductor. A typical value for the current sensing resistor 200 is 24 ohms.

One of the pair of supply conductors 196 and 198, in this embodiment the negative supply conductor 198, is further subdivided into a heating mode select conductor $\overline{HEAT}$ and a cooling mode select conductor $\overline{COOL}$ alternatively selected for continuity by the FIG. 1 mode switch 40. Preferably, as illustrated in FIG. 5, this particular portion of the mode switch 40 is in effect an SPDT switch, but comprises a contact 44″ of the FIG. 1 switch 44 and a contact 42″ of the separate FIG. 1 switch 42. This particular arrangement ensures that when the FIG. 1 movable panels 36 and 38 are intermediate the heating and cooling positions, neither of the contacts 42″ and 44″ is closed, and no power is applied to the remote control unit 164. More importantly, no current flows through the current sensing resistor 200 during this condition.

In the particular circuit illustrated herein wherein it is the negative supply conductor 198 which is subdivided into select conductors, the selected conductor $\overline{HEAT}$ or $\overline{COOL}$ is pulled to the negative supply through the current sensing resistor 200. Thus these two conductors $\overline{HEAT}$ and $\overline{COOL}$ are active-low digital logic lines. The circuitry within the remote control unit 164 responds to the heating and cooling mode select conductors $\overline{HEAT}$ and $\overline{COOL}$ to effect indications and operational connections appropriate to the particular mode selected.

Internally of the remote control unit 164, the positive supply conductor 196 is connected through the terminal A and then to a user ON/OFF switch 202, in turn connected to a positive supply conductor 204. The $\overline{HEAT}$ and $\overline{COOL}$ select conductors similiarly enter through the terminals B and C.

To indicate to the user which mode has been selected, a pair of indicator lamps, preferably light emitting diodes (LED's) 206 and 208 are connected through a common current limiting resistor 210 to the positive supply conductor 204, and through individual isolation diodes 212 and 214 to the $\overline{HEAT}$ and $\overline{COOL}$ select conductors, respectively.

In order to sense room temperature, a thermistor circuit, generally designated 216 includes a negative temperature coefficient thermistor 218 connected in series with a resistor 220 in voltage divider configuration, with the TEMP line supplied from the voltage divider tap point via the Terminal D. In the particular circuit described herein, it is desired that the thermistor circuit 216 provide a voltage (on the the TEMP line) directly representative of the actual degree of heating or cooling, regardless of whether heating mode or cooling mode operation is selected. In other words, during heating mode operation, the voltage on the TEMP line increases as the room gets warmer, and during cooling mode operation the voltage on the TEMP line increases as the room gets cooler.

To achieve this result, the thermistor 218 and resistor 220 are connected to an electronic DPDT switching arrangement 222 comprising a pair of inverters 224 and 226 having their inputs connected through appropriate biasing networks to the $\overline{HEAT}$ select conductor and the $\overline{COOL}$ select conductor, respectively. In particular, the input network for the inverter 224 includes resistors 228 and 230, and the input network for the inverter 226 includes resistors 232 and 234 and an isolation diode 236. Although conventional supply voltage connections to integrated circuit devices are not generally shown and described herein, in FIG. 5 the manner in which the inverters 224 and 226 are supplied during both heating mode and cooling mode operation is illustrated. In particular, the inverter 224 includes a positive supply voltage line 238 and a negative supply line 240 connected through a pair of isolation diodes 242 and 244 to the $\overline{HEAT}$ and $\overline{COOL}$ select conductors, respectively. It will be understood that the other inverter 226 is included within the same integrated circuit package as the inverter 224, and is accordingly supplied simultaneously. Preferably, the inverters 224 and 226 comprise CMOS digital logic devices. Suitable inverters are RCA Type No. CD4001 NOR Gates, with both NOR gate inputs tied together.

The electronic DPDT switch functions, during operation, to reverse the positive and negative supply voltage connections to the thermistor 218 and the resistor 220, depending on whether heating mode or cooling mode operation is selected. Specifically, during heating mode operation, the $\overline{HEAT}$ line is low, activating the inverter 224, the output of which is then high. The input to the inverter 226 is high, this inverter is therefore not activated, and its output is low. Thus the free end of the thermistor 218 (the end away from the midpoint connection to the TEMP line) is effectively connected to the positive supply conductor 204, and the free end of the resistor 220 is effectively connected to the negative supply conductor via the negative supply connection to the inverter 226. Since the thermistor 218 has a negative temperature coefficient, as temperature goes up, the thermistor 218 resistance goes down. Voltage on the the TEMP line goes up. Thus TEMP voltage is is directly related to actual temperature, as is desired for proper control action during heating mode operation.

On the other hand, when cooling mode operation is selected, the inverter 226 is activated, and the inverter 224 is not activated. Thus, the free end of the resistor 220 is in effect connected to the positive supply conductor 204, and the free end of the thermistor 218 is effectively connected to the (−) supply conductor. Therefore, as sensed temperature goes down, and the resistance of the thermistor 218 increases, the voltage on the TEMP line increases. Accordingly, the TEMP voltage is inversely related to actual temperature, as is desired for proper function during cooling mode operation.

It is this automatic switching of the connections to the thermistor circuit 216 in response to the selecting of either the HEAT select conductor or the COOL select conductor which enables the FIG. 6 comparator circuitry 166 to function identically during both heating and cooling mode operation.

In order to provide the SET reference voltage representative of the desired degree of heating or cooling, a temperature setting circuit 246 includes a temperature setting potentiometer 248 comprising the user "Setting" control connected in adjustable voltage divider configuration across the +8.2 VDC and negative (−) supply conductors. The SET line is supplied from the potentiometer 248 movable wiper 250 through the terminal E.

In this particular arrangement the left end of the potentiometer 248 is positive with respect to the right end, and these two ends are accordingly designated (+) and (−). Thus, as the user "Setting" control comprising the potentiometer is adjusted towards "More," the SET line voltage increases in a positive sense, whether for more heating or more cooling.

Although the (+) and (−) ends of the potentiometer 248 might simply be connected directly to the positive and negative supply lines, or connected to these supply lines through simple range-limiting resistors, the particular form of temperature setting circuit 246 illustrated provides additional refinements for the dual purposes of slightly varying the calibration between heating mode and cooling mode operation to correspond with similar changes in the characteristics of the thermistor circuit 216 and, secondly, to provide independent limiting of the maximum temperature during heating and the minimum temperature during cooling to correspond with the effect of the "Trimmer" illustrated in the graphs of FIGS. 3 and 4.

Specifically, the (−) end of the potentiometer 248 is connected to the tap point 252 of a selectable voltage divider 254 comprising a resistor 256 connected to the positive supply conductor 204, and a pair of resistors 258 and 260 connected through respective isolation diodes 262 and 264 to the HEAT and COOL lines, to be selectively connected in circuit depending upon whether heating mode or cooling mode operation is selected. This permits the characteristics of the desired temperature reference to be closely tailored to the characteristics of the thermistor circuit 216 for both heating and cooling mode operation.

Similarly, the (+) end of the temperature setting potentiometer 248 is connected to the tap point 266 of another selectable voltage divider 268 comprising a resistor 270 connected to the positive supply line 204, and a pair of alternately selected resistances 270 and 272 connected through respective isolation diodes 274 and 276 to the HEAT and COOL lines for selection according to whether heating mode or cooling mode operation is selected.

More particularly, the resistance 270 may be seen to comprise a variable heating mode trimmer variable resistor 278 in series with a fixed resistor 280, and paralleled by a fixed resistor 282. Similarly, the resistance 272 more particularly may be seen to comprise a cooling mode trimmer variable resistor 284 connected in series with a fixed resistor 286.

While there is no intention to limit the present invention to particular component values, the following TABLE of resistance values is provided by way of example for the purpose of more clearly explaining the operation of the temperature setting circuitry and the manner in which the temperature setting circuitry 246, together with the FIG. 6 biasing circuit arrangement 190, provide the characteristic curves of FIGS. 3 and 4:

TABLE

| | |
|---|---|
| Setting Potentiometer 248 | 50K Ohms |
| Resistor 256 | 6800 Ohms |
| Resistor 258 | 3000 Ohms |
| Resistor 260 | 3300 Ohms |
| Heat Trimmer Resistor 278 | 5000 Ohms, ± 20% |
| Resistor 280 | 4420 Ohms |
| Resistor 282 | 11K Ohms |
| Cool Trimmer Resistor 284 | 5000 Ohms, ± 20% |
| Resistor 286 | 4120 Ohms |

Preliminarily, with the above component values connected as shown in FIG. 5 it will be noted that the (+) end of the temperature setting potentiometer 248 is always positive with respect to the (−) end, regardless of the settings of the heat and cool trimmer resistors 278 and 284 and regardless of whether heating or cooling mode operation is selected. Thus, for either heating or cooling mode of operation, the voltage on the SET line increases as the setting of the potentiometer 248 comprising the user "Setting" control is moved towards "More".

During heating mode operation, the heat trimmer resistor 278 operates to increasingly limit the maximum temperature which may be user selected as its resistance is decreased. As the trimmer 278 resistance is decreased (assuming the $\overline{\text{HEAT}}$ select conductor is low and the isolation diode 274 is conducting), the tap point 266 voltage decreases, thus limiting the maximum possible magnitude of the SET line voltage, corresponding to the effect of the "Trimmer" adjustable shown in the graph of FIG. 3 towards the MAX limit.

It is a characteristic of this circuit arrangement that the precision of the maximum temperature limiting is not affected by the tolerance of the trimmer resistor 278. In particular, the trimmer resistor 278 may have a 20% tolerance, without affecting the accuracy of the ultimate limit. The reason for this is that maximum limiting occurs at the zero end of the variable resistance range, where trimmer resistor tolerance is not a factor.

Operation of the temperature setting circuit 246 during cooling mode operation is essentially similar, with only a slight change in SET voltage magnitudes due to the different-valued components which are switched in. Specifically, as the resistance of the cool trimmer resistor 284 is decreased, the limiting effect increases, limiting the amount of cooling a user can request by adjusting the setting potentiometer 248 towards "More". As in the case of heating mode limiting, the accuracy of the minimum temperature limiting is not affected by the tolerance of the trimmer resistor 284, but rather is determined by the resistances of the other resistors in the network.

The remaining circuitry shown in FIG. 5 is that of the current detector 188 comprising the twenty four Ohm current sensing resistor 200 and the comparator 96. A reference voltage divider comprising resistors 288 and 290 is connected through the input resistor 112 to the comparator 96 inverting (−) input, and the voltage drop across the current sensing resistor 200 is applied through the input resistor 114 to the comparator 96 non-inverting (+) input. The comparator 96 output has a pull-up resistor 292, and drives the base of an NPN switching transistor 294 through an input divider comprising resistors 296 and 298. The emitter of the switching transistor 294 is connected directly to the negative (−) supply conductor, and the transistors 294 collector is connected to drive the "-, SWITCHED" conductor.

In the operation of the current detector circuit 188, whenever the remote control unit 164 is connected, energized, and turned on, with the mode switch 40 in either the heating or cooling position, but not intermediate, current drawn by the various networks of the remote control unit 164 produces a voltage drop across the current sensing resistor 200. In this condition, the comparator 96 non-inverting (+) input is more positive than the inverting (−) input, and the comparator 96 output goes high, biasing the switching transistor 294 into conduction. this completes the negative supply return for those components, such as the FIG. 6 relay driver transistors 176 and 178, which are connected to the "-, SWITCHED" line. In particular, the relays K1, K2 and K3 are allowed to operate so that the various load devices of FIGS. 1 and 2 may be energized.

Conversely, if current for any reason does not flow throught the current sensing resistor 200, for example when the user ON/OFF switch 202 is OFF or the FIG. 1 movable panels 36 and 38 are in an intermediate position, the comparator 96 output is low, and the switching transistor 294 does not conduct. All loads, particularly drivers for the relays K1, K2 and K3, having their negative supply connection returned through the "-, SWITCHED" conductor cannot operate.

Referring lastly to FIG. 7, the remainder of the circuitry is concerned primarily with the automatic demand defrost functions for both heating and cooling. Additionally a portion of the FIG. 7 circuit is concerned with inhibiting activation of the supplemental electrical resistance heater 46 (FIG. 1) during heating mode operation in the event outdoor air temperature exceeds a predetermined temperature, for example 36° F. The FIG. 7 circuitry is automatically controlled in response to temperature sensed at three points in the heat pump unit 10 of FIG. 1. In the preferred embodiment illustrated, three negative temperature coefficient thermistors are employed for the sensing. It will be appreciated, however, that various other forms of temperature sensor may be employed.

In particular, an outside thermistor 300 (FIGS. 1 and 7) is positioned in the incoming path of the air stream 32 which circulates through the evaporator 16 from the outdoors during heating mode operation. An evaporator thermistor 302 is mounted in heat exchange relationship with a portion of the evaporator 16 so as to sense the temperature thereof. Lastly, a stopper thermistor 304 is positioned to sense the presence of cold defrost water draining from the evaporator 16 during a defrosting operation. In the particular arrangement illustrated, an evaporator drain pan 306 (FIG. 1) is positioned below the evaporator 16 so as to catch and appropriately direct cold defrost water draining from the evaporator 16 to a drain or discharge. The "stopper" thermistor 304 is preferably positioned in the drain pan 306 at a low point thereof.

In order inhibit activation of the supplemental electric resistance heater 46 during heating mode operation if outdoor air temperature exceeds a predetermined temperature, for example 36° F., thermostat stage two operation is inhibited under such conditions through operation of the comparator 110 and the outside thermistor 300. The outside thermistor 300 comprises an element of a voltage divider additionally comprising series resistors 308 and 310, and a resistor 312 in parallel with the thermistor 300. The junction of the thermistor 300 and the resistor 310 is connected through the input resistor 142 to the comparator 110 non-inverting (+) input, which functions as a comparison input. To establish a reference voltage for the comparator 110, a fixed voltage divider comprising resistors 314 and 316 is connected through the input resistor 140 to the comparator 110 inverting (−) input.

The output of the comparator 110 supplies an $\overline{\text{INHIBIT STAGE 2}}$ line, which is connected in parallel with the output of the FIG. 6 second stage comparator 100. Thus, when the $\overline{\text{INHIBIT STAGE 2}}$ line is low, conduction of the stage two switching transistor 178 and operation of the stage relay K2 are positively inhibited.

The various resistance values involved are selected such that, during heating mode operation, if the temperature of the outside thermistor 300 is sufficiently high, and its resistance correspondingly sufficiently low, the voltage on the comparator 110 non-inverting (+) input goes below the reference voltage applied to the comparator 110 inverting (−) input, and the comparator output goes low.

This particular inhibiting of stage two operation is prevented during cooling mode operation by a connection of the $\overline{\text{COOL}}$ line (from FIG. 5) through an isolation diode 318 to the midpoint of the voltage divider comprising the resistors 314 and 316. Specifically, during cooling mode operation, the $\overline{\text{COOL}}$ line is low, the isolation diode 318 conducts, pulling the comparator 110 inverting (−) input lower than the comparator 110 non-inverting (+) gets under any circumstance. Therefore, the output of the comparator 110 and the $\overline{\text{INHIBIT STAGE 2}}$ line remain high.

Circuit elements in FIG. 7 which control cooling mode demand defrost operation are the evaporator thermistor 302, which is connected in series with a resistor 320 in voltage divider configuration, and the comparator 102. The comparator 102 inverting (−) input functions as a comparison input and is connected through the input resistor 124 to the evaporator thermistor 302 voltage divider. The comparator 102 non-inverting (+) input functions as a reference input and is connected through the input resistor 126 to a fixed voltage divider comprising resistors 322 and 324. The comparator 102 additionally has an output pull-up resistor 326.

In operation, during cooling mode, whenever the evaporator temperature falls below a temperature predetermined by the relative resistances of the various resistors and the thermistor 302 involved, the resistance of the evaporator thermistor 302 becomes sufficiently high to increase the voltage on the comparator 102 inverting (−) input above the reference voltage maintained on the comparator 102 non-inverting (+) input, and the comparator 102 output goes low.

The output of the comparator 102 drives an INHIBIT STAGE 1 line, which is connected directly to the base of the FIG. 6 first stage switching transistor 176 through an isolation diode 314. Thus when the INHIBIT STAGE 1 line is low, the first stage relay K1 is deactivated.

At this point, the compressor 12 is deenergized, and evaporator 16 defrosting is effected by temperature equalization throughout the refrigeration system. As described in the above-referenced commonly-assigned McCarty application Ser. No. 144,795, various automatic check valves may be employed to hasten this process.

During cooling mode defrost operation, the first stage relay K1 is not activated, and the compressor 12 does not run. However, the second stage relay K2 is free to operate under control of the FIG. 6 second stage comparator 100 in the event measured room temperature is sufficiently high.

When sensed evaporator temperature subsequently increases, the voltage applied to the comparator 102 inverting (−) input begins to decrease. When this voltage is sufficiently low, as determined by the range of hysteresis introduced by the positive feedback resistor 156, the output of the comparator 102 and the INHIBIT STAGE 1 line again go high. Normal cooling operation resumes.

This particular defrost operation is inhibited during heating mode when the COOL line floats high due to the pull-up effect of the resistor 210, the LED 208, and the isolation diode 214 of the FIG. 5 remote control unit 164. The COOL line, connected to the comparator 102 non-inverting (+) input through an isolation diode 330, high, biases the comparator 102 non-inverting (+) input higher than the voltage on the inverting (−) input can ever get as a result of decreases in temperature of the evaporator thermistor 302.

The heating mode defrost circuitry is somewhat more complex in that two thermistors are used for initiating defrosting, and a third thermistor is used for terminating heating mode defrost operation. Specifically, heating mode defrosting operation is initiated by a decrease in evaporator 16 heat exchange efficiency as indicated by an increase in temperature differential between the outside thermistor 300 and the evaporator thermistor 302, recognized by means of the comparator 104. In particular, the midpoint of the resistors 308 and 310 comprising the elements of the outside thermistor 300 voltage divider is connected through the input resistor 128 to the comparator 104 inverting (−) input, and the midpoint of voltage divider comprising the resistor 320 and the evaporator thermistor 302 is connected through the input resistor 130 to the comparator 104 non-inverting (+) input. The comparator 104 also has an output pull-up resistor 332.

When the evaporator temperature as sensed by the thermistor 302 is sufficiently below the outside air temperature as sensed by the thermistor 300, the precise differential required being a function of the various resistance values involved, the comparator 104 non-inverting (+) input voltage becomes higher than the inverting (−) input voltage, and the comparator 104 output goes high. An exemplary temperature differential at which this defrost initiation occurs is 31° F.

The heating mode demand defrost circuitry of FIG. 7 also includes comparator circuitry generally designated 334, comprising the "stopper" thermistor 304 and the comparator 106, which circuitry 334 is connected through an isolation diode 336 so as to be initially energized when the output of the comparator 104 goes high at the beginning of a heating mode defrosting operation.

In particular, the comparator circuitry 334 includes a line 338 connected to the cathode of the isolation diode 336, and energized therethrough when the output of the comparator 104 is high to initiate heating mode defrosting operation.

The comparator circuitry 334 includes a reference voltage divider having resistors 340 and 342 connected through the input resistor 132 to the inverting (−) input, and another voltage divider comprising the stopper thermistor 304 and a resistor 344 connected through the input resistor 134 to the non-inverting (+) input. For the purpose of ensuring that the output of the comparator 106 is initially low, there is another voltage divider comprising series resistors 346, 348 and 350 connected between the +8.2 VDC supply conductor and the circuit negative (−) supply conductor. The midpoint of the resistors 348 and 350 is connected through an isolation diode 352 to the midpoint of the voltage divider resistors 340 and 342 connected to the comparator 106 inverting (−) input. The comparator 106 has an output pullup resistor 354, and a latching diode 356 is connected between the comparator 106 output and the line 338. The remaining connection associated with this particular portion of the circuit is a connection of the output of the comparator 106 through a control line 358, a current limiting resistor 360 and an isolation diode 362 directly to the inverting (−) input of the comparator 102 to operate the comparator 102 as an inverter.

In operation, when the output of the comparator 104 goes high to initiate heating mode defrost operation, voltage is applied to energize the line 338. At this point experience has shown the temperature of the stopper thermistor 304 to be relatively low, and the resistance thereof relatively high. The values of the resistors 340, 342 and 344 together with the resistance of the stopper thermistor 304 is such that the comparator 106 non-inverting (+) input is biased at a higher voltage than the inverting (−) input, with the result that the comparator 106 output goes high. This causes two things to occur: First, energization of the line 338 is maintained through the latching diode 356, even though the comparator 104 output again goes low as defrosting operation proceeds. Second, the comparator 102 is operated as an inverter through its inverting (−) input, a relatively large positive voltage being applied through the isolation diode 362 to the inverting (−) input. Even though the COOL line applied through the isolation diode 330 to the comparator 102 non-inverting (+) input is floating high, the voltage applied to the comparator 102 inverting (−) input is even higher.

The comparator 102 output therefore goes low, activating the INHIBIT STAGE 1 line, thus turning off the FIG. 6 first stage switching transistor 176 and the first stage relay K1. Operation of the compressor 12 ceases, and defrosting operation commences.

As discussed above, normally during heating mode operation, the second stage (supplemental electric resistance heating) is inhibited through operation of the outside thermistor 300 and the comparator 110 in the event outside temperature is above a predetermined temperature, for example 36° F. However, during periods of defrosting, it is not desirable to so inhibit operation of the supplemental electric resistance heater 46 because room temperature could get too low. Accordingly, the INHIBIT STAGE 1 line is applied through an isolation diode 364 (FIG. 7) to the comparator 110 inverting (−) input, thus keeping the output of this comparator 110 high, and allowing the second stage to operate in the event the room temperature thermostat control circuitry cells for it. It will be appreciated that the comparator 110 is thus operated as an inverter via its inverting (−) input.

As may be seen from the FIG. 2 circuit, to compensate for the loss of heating from heat pump operation during heating mode defrosting, the additional electric resistance heater 48 is allowed to operate. This additional heater 48 is energized through the de-energized first stage relay contacts K1-C and through the energized second stage relay contacts K2-C. Mode switch 40 contacts 44′ provide the N or neutral return for the 120 VAC supply line.

While heating mode defrosting is proceeding, the temperature of the stopper thermistor 304 is maintained at approximately 32° F. due to cold defrost water draining from the evaporator 16 (FIG. 1) passing thereover. However, when the evaporator 16 is completely defrosted, this flow of water ceases, and the temperature of the stopper thermistor 304 increases. The resistance thereof thus decreases, until the comparator 106 non-inverting input (+) is below that applied to the comparator 106 inverting (−) input, and the comparator 106 output goes low.

This resets the comparator circuitry 334 by removing energizing voltage from the line 338, (assuming the output of the comparator 104 responsive to evaporator and outside air differential temperature by this time is low), and additionally allows the output of the comparator 102 to again go high, thus deactivating the INHIBIT STAGE 1 line and allowing normal thermostaticly controlled heating operation to resume.

The remaining circuitry illustrated in FIG. 7 relates to a function active during heating mode defrost, and comprises the comparator 108. The comparator 108 inverting (−) input serves as a reference input, and is connected to the junction of voltage divider resitors 346 and 348. The comparator 108 non-inverting (+) input serves as a comparison input and is connected to the junction of resistors 308 and 310 in the voltage divider with the outside thermistor 300 which senses incoming evaporator airflow during heating mode operation. The comparator 108 has an output pull-up resistor 366, and has its output connected through a current limiting resistor 368 to the base of an NPN driver transistor 370, the collector of which is connected to drive the coil of relay K3. A free-wheeling diode 372 is connected in parallel with the relay K3 coil, and a biasing resistor 374 is connected between the transistor 370 base terminal and the (−) circuit reference line.

The emitter of the driver transistor 370 is returned to the "-, SWITCHED" line so that the relay K3 cannot be actuated when the FIG. 5 user ON/OFF switch 202 is off as sensed by the current detector circuitry 188.

The specific function of the comparator 108 and the relay K3 is to prevent operation of the evaporator fan motor 22 (FIGS. 1 and 2) in the event outdoor air temperature as sensed by the thermistor 300 is below 32° F. In such event, the resistance of the thermistor 300 increases to a point where the comparator 108 non-inverting (+) input voltage goes above the inverting (−) input fixed reference voltage. The comparator 108 output goes high, activating the driver transistor 370 and the relay coil K3.

From the power circuitry of FIG. 2, it may be seen that, during heating mode defrost when the first stage relay K1 is not activated and the second stage relay K2 is activated, power to operate the fan motors 22 and 24 is supplied from the L′ conductor through a circuit path comprising normally-closed contact K1-C, normally-open contact K2-C, normally-closed contact K1-D, and the user fan switch 54. (This assumes the user fan switch 54 is in the AUTO position. If the user fan switch 54 is in the MAN position the fan circuit including relay contact K3 is directly supplied from the L′ conductor.) The evaporator fan motor 22 only is also supplied through the normally-closed contact of relay K3. However, when outdoor air temperature is below 32° F., relay K3 operates and no power can be supplied to the evaporator fan motor 22. Thus below-freezing outdoor air, which otherwise would slow or even prevent the evaporator defrosting process, is not drawn over the evaporator 16.

Conversely, when outdoor temperature is above 32° F. during heating mode defrosting, the comparator 108 output is low, leaving both fan motor 22 and 24 free to operate when the second stage relay K2 is activated. (However, due to hysteresis introduced by the positive feedback resistor 148, if the comparator 108 output is initially high, an outdoor temperature of 35° F. is required to switch the comparator 108 output low.) The evaporator fan 18 then draws above-freezing temperature outdoor air over the evaporator 16, aiding in the defrosting operation.

For the purpose of enabling those skilled in the art without undue experimentation, the following TABLE provides suitable values for various of the resistances for which exemplary values are not given hereinabove. It will accordingly be appreciated that these component specifications are given by way of example, and not limitation:

TABLE

| Thermistors | |
|---|---|
| 300, 302, 304 | 10 K Ohms at 77° F. |
| Resistors | |
| 92 | 750 Ohm, 2 Watt |
| 168, 170, 292, 310, 366 | 6.8 K Ohm |
| 172, 174, 296, 368 | 2.2 K Ohm |
| 184, 186, 298, 354, 374, 360 | 4,7 K Ohm |
| 210 | 1500 Ohm |
| 220 | 11.5 K Ohm |
| 228, 232, 326 | 10 K Ohm |
| 230, 234 | 100 Ohm |
| 288 | 27 K Ohm |
| 290 | 360 Ohm |
| 308 | 49.9 K Ohm |
| 312 | 1 Meg Ohm |
| 314 | 86.6 K Ohm |
| 316 | 46.7 K Ohm |
| 320, 340 342 | 100 K Ohm |
| 322 | 196 K Ohm |
| 324 | 66.5 K Ohm |
| 332 | 16 K Ohm |
| 344 | 30.1 K Ohm |
| 346 | 140 K Ohm |
| 348 | 66.5 K Ohm |
| 350 | 34 K Ohm |

While a specific embodiment of the invention has been illustrated and described herein, it is realized that numerous modifications and changes will occur to those skilled in the art. It is therefore to be understood that the appended claims are intended to cover all such modifications and changes as fall within the true spirit and scope of the invention.

What is claimed is:

1. A two stage control circuit for a reversible air conditioning unit of the type having a heating mode and a cooling mode of operation and including operational elements for providing first and second stages of heating and cooling, said control circuit comprising:

a mode switch for making predetermined electrical connections depending upon whether heating mode or cooling mode operation is selected;

a first stage controlled switching device connected, when activated, to energize the first stage operational elements;

a second stage controlled switching device connected, when activated, to energize the second state operational elements;

thermostatic control circuitry for comparing sensed indoor temperature with a temperature setting and for activating said first and second stage controlled switching devices depending upon the difference between sensed indoor temperature and the temperature setting, said thermostatic control circuitry operable when the heating mode is selected to activate said first stage switching device if sensed indoor temperature is below the temperature setting and to additionally activate said second stage switching device if sensed indoor temperature is below the temperature setting by a predetermined differential amount, and operable when the cooling mode is selected to activate said first stage switching device if sensed indoor temperature exceeds the temperature setting and to additionally activate said second stage switching device if sensed indoor temperature exceeds the temperature setting by a predetermined differential amount;

a user control unit locatable remotely from a main portion of said control circuit, with power supplied to said remotely locatable user control unit from said control circuit main portion via a pair of supply conductors, one of said pair of supply conductors being subdivided into a heating mode select conductor and a cooling mode select conductor alternately selected for continuity by said mode switch;

said remotely locatable user control unit having a temperature setting potentiometer connected in adjustable voltage divider configuration across said pair of supply conductors to provide a voltage representative of the desired degree of heating or cooling;

said remotely locatable user control unit further having an indoor temperature sensor connected in a circuit to provide a voltage representative of the actual degree of heating or cooling, said indoor temperature sensor circuit responsive to said heating and cooling mode select conductors to selectively cause the voltage representative of the actual degree of heating or cooling to vary either directly or inversely with sensed temperature;

a heat limiting trimmer resistor and a cool limiting trimmer resistor respectively selected in response to said heating and cooling mode select conductors and arranged in combination with said potentiometer to controllably limit user selection of the voltage representative of the desired degree of heating or cooling; and comparator circuitry responsive to the voltage representative of desired degree of heating or cooling and to the voltage representative of the actual degree of heating or cooling to activate said first and second stage controlled switching devices depending upon the amount by which the voltage representative of the actual degree of heating or cooling falls short of the voltage representative of desired degree of heating or cooling.

2. A control circuit according to claim 1, wherein said trimmer resistors are arranged in circuit such that maximum limiting of the user selection occurs when said trimmer resistors are adjusted to substantially zero resistance, whereby the accuracy of the maximum limiting point is substantially unaffected by tolerance variation in particular components employed for said trimmer resistors.

3. A two stage control circuit for a reversible air conditioning unit of the type having a heating mode and a cooling mode of operation and including operational elements for providing first and second stages of heating and cooling, said control circuit comprising:

a mode switch for making predetermined electrical connections depending upon whether heating mode or cooling mode operation is selected;

a first stage controlled switching device connected, when activated, to energize the first stage operational elements;

a second stage controlled switching device connected, when activated, to energize the second state operational elements;

thermostatic control circuitry for comparing sensed indoor temperature with a temperature setting and for activating said first and second stage controlled switching devices depending upon the difference between sensed indoor temperature and the temperature setting, said thermostatic control circuitry operable when the heating mode is selected to activate said first stage switching device if sensed indoor temperature is below the temperature setting and to additionally activate said second stage switching device if sensed indoor temperature is below the temperature setting by a predetermined differential amount, and operable when the cooling mode is selected to activate said first stage switching device if sensed indoor temperature exceeds the temperature setting and to additionally activate said second stage switching device if sensed indoor temperature exceeds the temperature setting by a predetermined differential amount;

a user control unit locatable remotely from a main portion of said control circuit, with power supplied to said remotely locatable user control unit from said control circuit main portion via a pair of supply conductors, one of said pair of supply conductors being subdivided into a heating mode select conductor and a cooling mode select conductor alternately selected for continuity by said mode switch;

said remotely locatable user control unit having a temperature setting potentiometer connected in adjustable voltage divider configuration across said pair of supply conductors to provide a voltage representative of the desired degree of heating or cooling;

said remotely locatable user control unit further having an indoor temperature sensor connected in a circuit to provide a voltage representative of the actual degree of heating or cooling, said indoor temperature sensor circuit responsive to said heating and cooling mode select conductors to selectively cause the voltage representative of the actual degree of heating or cooling to vary either directly or inversely with sensed temperature;

a user ON/OFF switch for interrupting said supply conductors; said control circuit further comprising a detector for detecting an absence of current through said supply conductors when said user ON/OFF switch is OFF or when said remotely locatable user control unit is disconnected, and for disabling operation of said first and second controlled switching devices in response; and comparator circuitry responsive to the voltage representative of desired degree of heating or cooling and to the voltage representative of the actual degree of heating or cooling to activate said first and second stage controlled switching devices depending upon the amount by which the voltage representative of the actual degree of heating or cooling falls short of the voltage representative of desired degree of heating or cooling.

4. A two stage control circuit for a reversible air cycle heat pump unit of the type having a heating mode and a cooling mode of operation and including a closed circuit refrigeration system having a compressor, an evaporator and a condenser; an at least two-speed motor-driven fan for moving air over the evaporator; an at least two-speed motor-driven fan for moving air over the condenser; an arrangement for alternatively circulating outdoor airflow over the evaporator and indoor airflow over the condenser during heating mode operation and circulating indoor airflow over the condenser and outdoor airflow over the evaporator during cooling mode operation; and at least one controllable supplemental electric resistance heater for warming indoor air during heating mode operation; said control circuit comprising:

a mode switch for making predetermined electrical connections depending upon whether heating mode or cooling mode operation is selected;

a first stage controlled switching device connected, when activated, to energize the compressor and the fans;

a second stage controlled switching device connected, when activated, to condition the fans for relatively higher speed operation and to activate the supplemental electric heater if heating mode operation is selected; and thermostatic control circuitry for comparing sensed indoor temperature with a temperature setting and for activating said first and second stage controlled switching devices depending upon the difference between sensed indoor temperature and the temperature setting, said thermostatic control circuitry operable when the heating mode is selected to activate said first stage switching device if sensed indoor temperature is below the temperature setting and to additionally activate said second stage switching device if sensed indoor temperature is below the temperature setting by a predetermined differential amount, and operable when the cooling mode is selected to activate said first stage switching device if sensed indoor temperature exceeds the temperature setting and to additionally activate said second stage switching device if sensed indoor temperature exceeds the temperature setting by a predetermined differential amount.

5. A two stage control circuit according to claim 4, which further comprises circuitry for sensing outdoor air temperature and inhibiting activation of the supplemental electric heater during heating mode operation if outdoor air temperature exceeds a predetermined temperature, whereby unnecessary operating expense is avoided.

6. A two stage control circuit according to claim 5, wherein said circuitry for inhibiting activation of the supplemental electric heater during heating mode operation if outdoor air temperature exceeds a predetermined temperature operates by inhibiting activation of said second stage controlled switching device.

7. A control circuit according to claim 4, which further comprises heating mode demand defrost circuitry for recognizing excessive frost accumulation on the evaporator and for interrupting operation of the compressor to allow defrosting, said heating mode demand defrost circuitry including:

a sensor for sensing the temperature of outdoor air entering the evaporator;

a sensor for sensing the temperature of a portion of the evaporator;

circuitry responsive to said outdoor air sensor and to said evaporator sensor for generating a signal to initiate defrosting when sensed evaporator temperature falls a predetermined amount below sensed outdoor air temperature; and circuitry for inhibiting activation of said first stage controlled switching device in response to the signal to initiate defrosting.

8. A control circuit according to claim 7, wherein said heating mode demand defrost circuitry includes further circuitry responsive to said outdoor air sensor for inhibiting operation of the evaporator fan during a defrosting operation if outdoor air temperature is below approximately 32° F.

9. A control circuit according to claim 7, wherein said second stage controlled switching device is further connected, when activated, if heating mode operation is selected to energize a second supplemental electric heater in the event activation of said first stage switching device is inhibited, whereby additional indoor electric resistance heat is provided as needed to compensate for the absence of heat pump operation during heating mode defrosting.

10. A control circuit according to claim 7, wherein said heating mode demand defrost circuitry further includes:

a temperature sensor for sensing the presence of cold defrost water draining from the evaporator during a defrosting operation; and circuitry responsive to an increase in the temperature of said drain water sensor indicative of the end of defrost water flow for generating a signal to terminate a defrosting operation.

11. A control circuit according to claim 7, which further comprises cooling mode demand defrost circuitry for recognizing excessive frost accumulation on the evaporator and for interrupting operation of the compressor to allow defrosting, said cooling mode demand defrost circuitry including:

circuitry responsive to said evaporator sensor for inhibiting activation of said first stage controlled switching device when sensed evaporator temperature falls below a predetermined temperature indicative of excessive evaporator frost, and for permitting activation of said first stage controlled switching device when sensed evaporator temperature rises above the predetermined temperature.

12. A control circuit according to claim 4, which further comprises cooling mode demand defrost circuitry for recognizing excessive frost accumulation on the evaporator and for interrupting operation of the compressor to allow defrosting, said cooling mode demand defrost circuitry including:
a sensor for sensing the temperature of a portion of the evaporator;
circuitry responsive to said evaporator sensor for inhibiting activation of said first stage controlled switching device when sensed evaporator temperature falls below a predetermined temperature indicative of excessive evaporator frost, and for permitting activation of said first stage controlled switching device when sensed evaporator temperature rises above the predetermined temperature.

13. A control circuit according to claim 12, wherein the predetermined temperature indicative of excessive evaporator frost during cooling mode operation is 32° F.

14. A control circuit according to claim 4, wherein:
said thermostatic control circuitry includes a user control unit locatable remotely from a main portion of said control circuit, with power supplied to said remotely locatable user control unit from said control circuit main portion via a pair of supply conductors, one of said pair of supply conductors being subdivided into a heating mode select conductor and a cooling mode select conductor alternately selected for continuity by said mode switch;
said remotely locatable user control unit having a temperature setting potentiometer connected in adjustable voltage divider configuration across said pair of supply conductors to provide a voltage representative of the desired degree of heating or cooling,
said remotely locatable user control unit further having an indoor temperature sensor connected in a circuit to provide a voltage representative of the actual degree of heating or cooling, said indoor temperature sensor circuit responsive to said heating and cooling mode select conductors to selectively cause the voltage representive of the actual degree of heating or cooling to vary either directly or inversely with sensed temperature; and
comparator circuitry responsive to the voltage representative of desired degree of heating or cooling and to the voltage representative of the actual degree of heating or cooling to activate said first and second stage controlled switching devices depending upon the amount by which the voltage representative of the actual degree of heating or cooling falls short of the voltage representative of desired degree of heating or cooling.

15. A control circuit according to claim 14, wherein said remotely locatable user control unit includes a heat limiting trimmer resistor and a cool limiting trimmer resistor respectively selected in response to said heating and cooling mode select conductors and arranged in combination with said potentiometer to controllably limit user selection of the voltage representative of the desired degree of heating or cooling.

16. A control circuit according to claim 15, wherein said trimmer resistors are arranged in circuit such that maximum limiting of the user selection occurs when said trimmer resistors are adjusted to substantially zero resistance, whereby the accuracy of the maximum limiting point is substantially unaffected by tolerance variation in particular components employed for said trimmer resistors.

17. A control circuit according to claim 14, wherein said comparator circuitry responsive to the voltage representative of the desired and the actual degrees of heating or cooling comprises:
a first stage comparator having a reference input connected to receive the voltage representative of the desired degree of heating or cooling, a comparison input connected to receive the voltage representative of the actual degree of heating or cooling, and an output connected to said first stage controlled switching device;
a second stage comparator having a reference input connected to receive the voltage representative of the desired degree of heating or cooling, a comparison input connected to receive the voltage representative of the actual degree of heating or cooling, and an output connected to said second stage controlled switching device; and
a biasing circuit arrangement for shifting the switching thresholds of said first and second stage comparators with respect to each other to provide the temperature differentials between the switching points of said first and second stage controlled switching devices.

18. A control circuit according to claim 17, wherein:
each of said first and second stage comparators has a pair of series input resistors connected to the voltage representative of the desired degree of heating or cooling and the voltage representative of the actual degree of heating or cooling; and wherein said biasing circuit arrangement includes relatively high resistances connected to cause a biasing current to flow between positive and negative supply conductors through an input resistor of each of said first and second stage comparators.

19. A control circuit according to claim 14, wherein:
said remotely locatable user control unit includes a user ON/OFF switch for interrupting said supply conductors; and said control curcuit further comprises
a current detector for detecting an absence of current through said supply conductors when said user ON/OFF switch is OFF or when said remotely locatable user control unit is disconnected, and for disabling operation of said first and second controlled switching devices in response.

20. A control circuit for a reversible air conditioning unit of the type having a heating mode and a cooling mode of operation with at least one controlled device activated for causing a heating or cooling effect depending upon whether heating or cooling mode operation is selected, said control circuit comprising:
a mode switch for making predetermined electrical connections depending upon whether heating mode or cooling mode operation is selected;
thermostatic control circuitry for comparing sensed indoor temperature with a temperature setting and for activating said controlled device depending upon the difference between sensed indoor temperature and the temperature setting, said thermostatic control circuitry operable when the heating mode is selected to activate said controlled device if sensed indoor temperature is below the temperature setting, and operable when the cooling mode is selected to activate said controlled device if sensed indoor temperature exceeds the temperature setting;

said thermostatic control circuitry including a user control unit locatable remotely from a main portion of said control circuit, with power supplied to said remotely locatable user control unit from said control circuit main portion via a pair of supply conductors, one of said pair of supply conductors being subdivided into a heating mode select conductor and a cooling mode select conductor alternately selected for continuity by said mode switch, said remotely locatable user control unit having a temperature setting potentiometer connected in adjustable voltage divider configuration across said pair of supply conductors to provide a voltage representative of the desired degree of heating or cooling, said remotely locatable user control unit further having an indoor temperature sensor connected in a circuit to provide a voltage representative of the actual degree of heating or cooling, said indoor temperature sensor circuit responsive to said heating and cooling mode select conductors to selectively cause the voltage representative of the actual degree of heating or cooling to vary either directly or inversely with sensed temperature; and comparator circuitry responsive to the voltage representative of desired degree of heating or cooling and to the voltage representatve of the actual degree of heating or cooling to activate said controlled device when the voltage representative of the actual degree of heating or cooling falls below the voltage representative of desired degree of heating or cooling.

21. A control circuit according to claim 20, wherein: said remotely locatable user control unit includes a user ON/OFF switch for interrupting said supply conductors; and said control circuit further comprises a current detector for detecting an absence of current through said supply conductors when said user ON/OFF switch is OFF or when said remotely locatable user control unit is disconnected, and for disabling operation of said controlled device in response.

22. A control circuit according to claim 20, wherein said thermostatic control circuitry provides two-stage heating and cooling control and activates corresponding first and second stage controlled devices, and said comparator circuitry responsive to the voltage representative of the desired and the actual degrees of heating or cooling comprises:

a first stage comparator having a reference input connected to receive the voltage representative of the desired degree of heating or cooling, a comparison input connected to receive the voltage representative of the actual degree of heating or cooling, and an output connected to said first stage controlled device;

a second stage comparator having a reference input connected to receive the voltage representative of the desired degree of heating or cooling, a comparison input connected to receive the voltage representative of the actual degree of heating or cooling, and an output connected to said second stage controlled device; and a biasing circuit arrangement for shifting the switching thresholds of said first and second stage comparators with respect to each other to provide the temperature differential between the switching points of said first and second stage controlled switching devices.

23. A control circuit according to claim 22, wherein: each of said first and second stage comparators has a pair of series input resistors connected to the voltage representative of the desired degree of heating or cooling and the voltage representative of the actual degree of heating or cooling; and wherein said biasing circuit arrangement includes relatively high resistances connected to cause a biasing current to flow between positive and negative supply conductors through an input resistor of each of said first and second stage comparators.

24. A control circuit according to claim 20, wherein said remotely locatable user control unit includes a heat limiting trimmer resistor and a cool limiting trimmer resistor respectively selected in response to said heating and cooling mode select conductors and arranged in combination with said potentiometer to controllably limit user selection of the voltage representative of the desired degree of heating or cooling.

25. A control circuit according to claim 24, wherein said trimmer resistors are arranged in circuit such that maximum limiting of the user selection occurs when said trimmer resistors are adjusted to substantially zero resistance, whereby the accuracy of the maximum limiting point is substantially unaffected by tolerance variation in particular components employed for said trimmer resistors.

* * * * *